(12) United States Patent
Wang et al.

(10) Patent No.: US 12,549,490 B2
(45) Date of Patent: Feb. 10, 2026

(54) FLOW TABLE AGING METHOD AND DEVICE, COMPUTER APPARATUS AND STORAGE MEDIUM

(71) Applicant: Beijing Volcano Engine Technology Co., Ltd., Beijing (CN)

(72) Inventors: Bin Wang, Beijing (CN); Yaobao Wang, Beijing (CN); Hongcan Fang, Beijing (CN); Haixin Yu, Beijing (CN); Shaoxing Li, Beijing (CN); Lizhong Chen, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/639,113

(22) Filed: Apr. 18, 2024

(65) Prior Publication Data
US 2024/0356858 A1    Oct. 24, 2024

(30) Foreign Application Priority Data

Apr. 23, 2023    (CN) .......................... 202310445895.9

(51) Int. Cl.
*H04L 47/2483*    (2022.01)
*H04L 47/625*    (2022.01)

(52) U.S. Cl.
CPC ........ *H04L 47/2483* (2013.01); *H04L 47/625* (2013.01)

(58) Field of Classification Search
CPC .......................... H04L 47/2483; H04L 47/625
(Continued)

(56) References Cited

U.S. PATENT DOCUMENTS

| 8,300,525 B1 | 10/2012 | Kohn et al. |
| 2012/0263186 A1 | 10/2012 | Ueno |

(Continued)

FOREIGN PATENT DOCUMENTS

| CN | 102780641 B | 7/2015 |
| CN | 109634966 A | 4/2019 |

(Continued)

OTHER PUBLICATIONS

China National Intellectual Property Administration, Notice of Allowance Issued in Application No. 202310445895.9, Feb. 27, 2025, 8 pages.

(Continued)

*Primary Examiner* — Ruolei Zong
(74) *Attorney, Agent, or Firm* — Alleman Hall & Tuttle LLP

(57) ABSTRACT

A flow table aging method, a device, a computer apparatus and a storage medium are provided. The method includes: determining a to-be-released assigned flow identifier stored at a link head position in response to a number of assigned flow identifiers in the data linked list reaching a preset threshold; the data linked list being configured to store assigned flow identifiers corresponding to data addresses in accordance with an access timing sequence, and to store a first association relationship between each assigned flow identifier and a previous assigned flow identifier and a second association relationship between the assigned flow identifier and a next assigned flow identifier; deleting the to-be-released assigned flow identifier and the corresponding first and second association relationships, and updating linked list information; and deleting the mapping relationship between the to-be-released assigned flow identifier and the corresponding data address, and initializing the number counted by the target port.

20 Claims, 5 Drawing Sheets

(58) Field of Classification Search
USPC .......................................................... 709/238
See application file for complete search history.

(56) References Cited

U.S. PATENT DOCUMENTS

| | | | |
|---|---|---|---|
| 2013/0148667 A1 | 6/2013 | Hama et al. | |
| 2014/0269750 A1* | 9/2014 | Tsirkin | H04L 49/70 |
| | | | 370/413 |
| 2017/0099196 A1* | 4/2017 | Barsheshet | H04L 43/028 |
| 2017/0250869 A1 | 8/2017 | Voellmy | |
| 2018/0109461 A1* | 4/2018 | Shibuya | H04L 41/20 |
| 2018/0131602 A1* | 5/2018 | Civanlar | H04L 45/64 |
| 2019/0268272 A1* | 8/2019 | Mizrahi | H04L 47/2441 |
| 2020/0364156 A1* | 11/2020 | Wang | H04L 47/10 |
| 2023/0269187 A1* | 8/2023 | Keung | H04L 47/196 |
| | | | 370/235 |

FOREIGN PATENT DOCUMENTS

| | | |
|---|---|---|
| CN | 113595822 A | 11/2021 |
| CN | 114489505 A | 5/2022 |
| CN | 114531405 A | 5/2022 |
| CN | 114915587 A | 8/2022 |
| CN | 115309671 A | 11/2022 |
| CN | 116366530 B | 3/2025 |
| JP | 2013168817 A * | 8/2013 |
| WO | 2020236302 A1 | 11/2020 |

OTHER PUBLICATIONS

First Office Action for Chinese Application No. 202310445895.9, Oct. 13, 2024, 12 Pages.

European Patent Office, Communication pursuant to Rules 70(2) and 70a(2) EPC and reference to Rule 39(1) EPC for European Application No. 24170435.2, mailed Nov. 5, 2024, 2 pages.

European Patent Office, Extended European Search Report Issued in Application No. 24170435.2, Sep. 11, 2024, 8 pages.

Yurekten, O. "Citadel: Cyber threat intelligence assisted defense system for software-defined networks," Computer Networks, vol. 191, May 22, 2021, 25 pages.

* cited by examiner

FLOW TABLE AGING METHOD AND DEVICE, COMPUTER APPARATUS AND STORAGE MEDIUM

CROSS-REFERENCE TO RELATED APPLICATION(S)

This application claims the priority of Chinese Patent Application No. 202310445895.9 filed on Apr. 23, 2023, the entire contents of which are incorporated herein by reference as a part of this application.

TECHNICAL FIELD

The present disclosure relates to the field of computer technology, and in particular to a flow table aging method and device, a computer apparatus and a storage medium.

BACKGROUND

OpenFlow is a network communication protocol capable of controlling the forwarding plane (also referred to as data plane) of interactors or routers on the network, thereby changing the network path taken by network data packets. In the OpenFlow architecture, data is often processed in units of flows, and a flow table, which acts as a collection of policy entries for a particular flow, can be responsible for data packet lookup and forwarding. However, due to the large traffic of the data flow, a huge number of entries will also be generated; furthermore, due to the limited caches used to store the entries, the number of data ports that can be assigned is also limited. As a result, the efficiency of data access will be affected if the entries are not aged in a timely manner.

A common way of flow table aging is done by using time stamps of respective entries. However, flow table aging by using time stamps requires for comparing the current time stamp with the stored time stamps associated with the respective entries, and usually involves the problem that the aging period is long and the aging efficiency is poor, which affects the efficiency of flow table aging.

SUMMARY

Embodiments of the present disclosure provide at least a flow table aging method and device, a computer apparatus, and a storage medium.

Embodiments of the present disclosure provide a flow table aging method, including: determining a to-be-released flow identifier stored at a link head position of a pre-established data linked list in response to a number of assigned flow identifiers in the data linked list reaching a preset threshold; wherein the data linked list is configured to store an assigned flow identifier corresponding to a data address in accordance with an access timing sequence of the data address, and store a first association relationship between the assigned flow identifier and a previous assigned flow identifier stored prior to the assigned flow identifier, and a second association relationship between the assigned flow identifier and a next assigned flow identifier stored subsequent to the assigned flow identifier; wherein a target port identified by the assigned flow identifier is configured to count a number of data packet stored at the data address; and wherein a mapping relationship between the data address and the assigned flow identifier is configured to characterize a flow table associated with the target port; deleting the to-be-released flow identifier as well as the corresponding first association relationship and the corresponding second association relationship from the data linked list, and updating linked list information of the data linked list; and deleting a mapping relationship between the to-be-released flow identifier and the corresponding data address, and initializing the number counted by the target port.

In a possible implementation, the data linked list includes the data linked list includes a first linked list and a second linked list, the first linked list is configured to store the first association relationship for each assigned flow identifier, and the first association relationship is configured to indicate the previous assigned flow identifier stored prior to the assigned flow identifier; the deleting the to-be-released flow identifier as well as the corresponding first association relationship and the corresponding second association relationship from the data linked list, and updating the linked list information of the data linked list, includes: deleting, for the first linked list, the to-be-released flow identifier and the first association relationship corresponding to the to-be-released flow identifier, and updating the assigned flow identifier corresponding to a link head position of the first linked list and the first association relationship corresponding to a next assigned flow identifier of the to-be-released flow identifier; and deleting, for the second linked list, the to-be-released flow identifier and the second association relationship corresponding to the to-be-released flow identifier, and updating the assigned flow identifier corresponding to a link head position of the second linked list.

In a possible implementation, the data linked list includes a doubly linked list in which respective assigned flow identifiers are stored, each of the respective assigned flow identifiers has a corresponding first pointer and a corresponding second pointer, the first pointer is configured to indicate the first association relationship to which the assigned flow identifier corresponds, and the second pointer is configured to indicate the second association relationship to which the assigned flow identifier corresponds; the deleting the to-be-released flow identifier as well as the corresponding first association relationship and the corresponding second association relationship from the data linked list, and updating the linked list information of the data linked list, includes: deleting the to-be-released flow identifier from the doubly linked list, and deleting the first association relationship indicated by the first pointer corresponding to the to-be-released flow identifier and the second association relationship indicated by the second pointer corresponding to the to-be-released flow identifier; and updating the assigned flow identifier corresponding to a link head position of the doubly linked list and the first association relationship indicated by the first pointer corresponding to a next assigned flow identifier of the to-be-released flow identifier.

In a possible implementation, the data linked list is established according to the following steps: assigning a corresponding target flow identifier for a target data address from unassigned flow identifiers among preset flow identifiers, in response to a data flow access operation for the target data address, when a target assigned flow identifier matched with the target data address does not exist; determining a target association relationship to which the target flow identifier corresponds, according to the assigned flow identifiers stored in the data linked list; updating the second association relationship of the assigned flow identifier at a link tail position of the data linked list by using the target flow identifier; and updating link tail information of the data linked list by using the target flow identifier and the target association relationship.

In a possible implementation, the flow table aging method further includes: determining a storage location of the target assigned flow identifier in the data linked list when the target assigned flow identifier exists; and determining a linked list updating operation based on the storage location, and updating the data linked list in accordance with the linked list updating operation.

In a possible implementation, the determining the linked list updating operation based on the storage location includes: when the storage location is located at the link head position of the data linked list, determining the linked list updating operation includes: deleting the target assigned flow identifier at the link head position of the data linked list as well as the corresponding first association relationship and the corresponding second association relationship, updating a flow identifier at the link head position of the data linked list with a next assigned flow identifier of the target assigned flow identifier, updating the second association relationship of the assigned flow identifier at the link tail position of the data linked list by using the target assigned flow identifier, and updating the link tail information of the data linked list by using the target assigned flow identifier and a corresponding newly established association relationship.

In a possible implementation, the determining the linked list updating operation based on the storage location includes: when the storage location is located at a preset position of the data linked list, determining the linked list updating operation includes: deleting the target assigned flow identifier at the preset position as well as the corresponding first association relationship and the corresponding second association relationship, updating an established association relationship of an associated assigned flow identifier adjacent to the target assigned flow identifier, and updating the link tail information of the data linked list by using the target assigned flow identifier and a corresponding newly established association relationship; wherein the preset position is a position in the data liked list other than the link head position and the link tail position.

In a possible implementation, when the target assigned flow identifier exists, the flow table aging method further includes: updating the number of data packets counted by the target port identified by the target assigned flow identifier.

Embodiments of the present disclosure further provide a flow table aging device, including: a determining module, configured to determine a to-be-released flow identifier stored at a link head position of a pre-established data linked list in response to a number of assigned flow identifiers in the data linked list reaching a preset threshold; wherein the data linked list is configured to store an assigned flow identifier corresponding to a data address in accordance with an access timing sequence of the data address, and store a first association relationship between the assigned flow identifier and a previous assigned flow identifier stored prior to the assigned flow identifier, and a second association relationship between the assigned flow identifier and a next assigned flow identifier stored subsequent to the assigned flow identifier; wherein a target port identified by the assigned flow identifier is configured to count a number of data packets stored at the data address; and wherein a mapping relationship between the data address and the assigned flow identifier is configured to characterize a flow table associated with the target port; a first deleting module, configured to delete the to-be-released flow identifier as well as the corresponding first association relationship and the corresponding second association relationship from the data linked list, and update linked list information of the data linked list; and a second deleting module, configured to delete a mapping relationship between the to-be-released flow identifier and the corresponding data address, and initialize the number counted by the target port.

An optional implementation of the present disclosure also provides computer apparatus, including a processor and a memory storing machine-readable instructions executable by the processor, wherein the processor is configured to execute the machine-readable instructions stored in the memory; when the machine-readable instructions are executed by the processor, the processor performs the above-described method, or the steps in any of the possible implementations of the above-described method.

An optional implementation of the present disclosure also provides computer-readable storage medium having a computer program stored thereon; when the computer program is executed by a computer apparatus, the computer apparatus performs the above-described method, or the steps in any of the possible implementations of the above-described method.

For the description of the effects of the above-described flow table aging device, the computer apparatus, and the computer-readable storage medium, reference can be made to the description of the above-described flow table aging method, which will not be repeated here.

In order for the above objects, features and advantages of the present disclosure to be more readily apparent, the detailed description of the preferred embodiments will be given below with reference to the accompanying drawings.

BRIEF DESCRIPTION OF DRAWINGS

In order to more clearly illustrate the technical solutions of the embodiments of the present disclosure, the accompanying drawings required for use in the embodiments, which are incorporated in and constitute a part of the specification, illustrate embodiments consistent with the present disclosure and, together with the description, serve to explain the technical solutions of the present disclosure, will be briefly described below. It is to be understood that the following drawings illustrate only certain embodiments of the present disclosure and are therefore not to be considered limiting in scope, and that other related drawings may be derived therefrom by one of ordinary skill in the art without inventive step.

DETAILED DESCRIPTION

Figure 1:
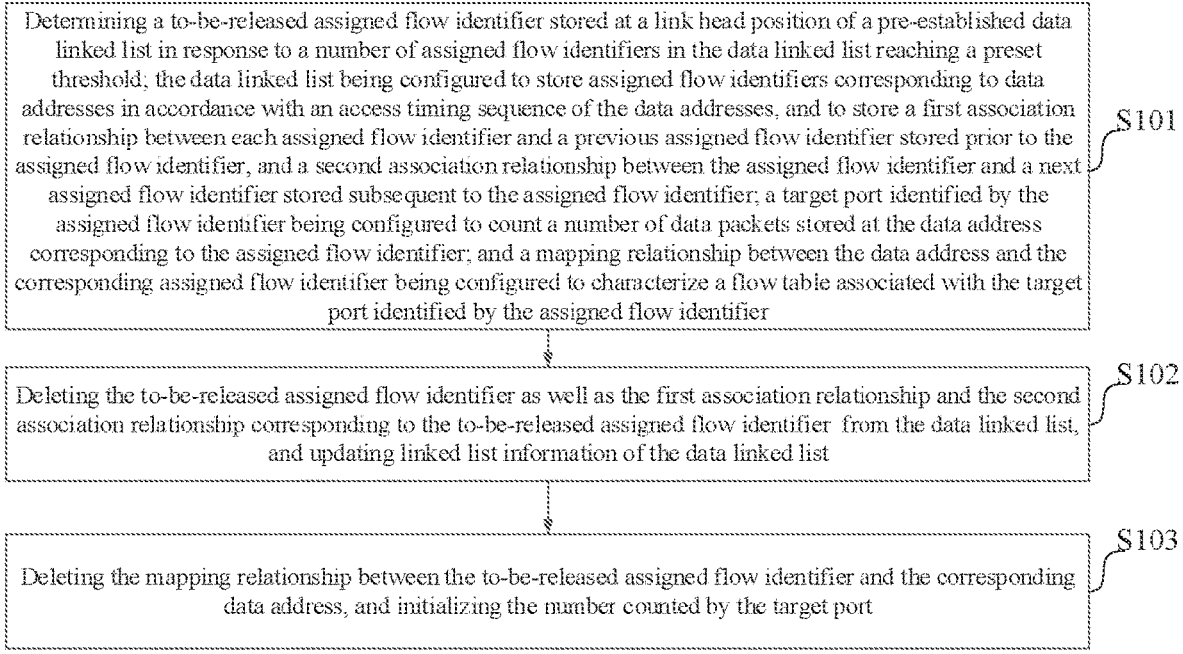
FIG. 1 shows a flowchart of a flow table aging method according to an embodiment of the present disclosure.

To make the objects, technical solutions and advantages of the embodiments of the present disclosure clearer, the technical solutions in the embodiments of the present disclosure will be clearly and completely described below in conjunction with the accompanying drawings in the embodiments of the present disclosure, it is obvious that the described embodiments are only a part of the embodiments of the present disclosure, rather than all of the embodiments. The components of the embodiments of the present disclosure as generally described and illustrated herein could be arranged and designed in a wide variety of different configurations. Thus, the following detailed description of the embodiments of the disclosure is not intended to limit the scope of the disclosure, as claimed, but is merely representative of selected embodiments of the disclosure. Based on the embodiments of the present disclosure, all other embodiments obtained by those skilled in the art without making creative labor belong to the scope of protection of the present disclosure.

Furthermore, the terms "first", "second" and the like in the description and claims and above drawings in embodiments of the present disclosure are used for distinguishing between similar objects and not necessarily for describing a particular sequential or chronological order. It is to be understood that such use of data may be interchanged under appropriate circumstances such that the embodiments described herein are capable of being practiced in sequences other than those illustrated or described herein.

References herein to "a plurality of or several" mean two or more. The expression "and/or" that describes an association relationship of associated objects means that three kinds of relationships may exist, for example, A and/or B may mean that A alone exists, A and B both exist, and B alone exists. The character "/" generally indicates that the contextual objects are in an "OR" relationship.

It has been found in research that the flow table aging mechanism has a wide range of application scenarios, and common flow table aging may include mac address aging, address pointer aging, etc., while conventional flow table aging is done in such a way that the time stamp mechanism is used all the time to achieve deletion of unwanted flow tables to improve the utilization efficiency of the flow table space. However, the above-described flow table aging method is problematic in that each time the flow table aging is performed, the entire entry space needs to be scanned and then the time stamp of each entry is compared with the current time stamp of the timer to select the data flow to be aged. The entire process takes a long time period, which affects the efficiency of the flow table aging. For example, for the current aging method, if it needs to select one aged flow table for 4 clock cycles, since the current aging module takes exactly 4 clock cycles to select the to-be-aged flow table from 32 flow tables, in the case of 1K queues (i.e., there are 1K flows), the flow table space needs to be copied for 1K/32=32 in order to select the to-be-aged flow table for 4 clock cycles; as a result, 32 aging modules are required to perform the aging process. Thus, as it can be seen, once the number of flow tables is large, the complexity of the aging system is increased in order to achieve aging of the flow tables, resulting in problems of large resource consumption and poor aging efficiency.

Based on the above studies, the present disclosure provides a flow table aging method and device, a computer apparatus and a storage medium, in which one flow identifier corresponds to one flow table entry and is also associated with one target port, and in which sequential storage of each data flow can be achieved by storing an assigned flow identifier corresponding to each data address in a data linked list in accordance with an access timing sequence. With the preset threshold, the timing of deleting the assigned flow identifiers in the data linked list can be accurately determined; and at the same time, since the respective assigned flow identifiers in the data linked list are stored according to a timing sequence, a timely release of the target port associated with the to-be-released flow identifier having the longest access time can be achieved by deleting the to-be-released flow identifier stored at the link head position, the first association relationship and second association relationship corresponding to the to-be-released flow identifier, and the mapping relationship between the to-be-released flow identifier and the corresponding data address when it is determined that the flow table aging is required, thereby completing a timely deletion of the flow table entry associated with the above-mentioned data address to achieve the flow table aging. The entire flow table aging process can achieve timely aging of the flow table without comparing the current time stamp with the time stamp corresponding to each flow table entry, but only uses the to-be-released flow identifier stored at the link head position of the data linked list, which effectively reduces the time for aging of the flow table and improves the efficiency of aging of the flow table.

The deficiencies of the above solutions are all the results of the inventor(s)'s practice and careful study, and therefore, the discovery process of the above problems and the solutions proposed by the present disclosure to the above problems hereinafter should be contributions made by the inventor(s) to the present disclosure during the course of the present disclosure.

It should be noted that similar numerals and letters represent similar items in the following figures, and therefore, once an item is defined in one figure, it needs not be further defined and explained in the subsequent figures.

It can be understood that before using the technical solution disclosed by the embodiments of the present disclosure, the user should be informed of the type, the usage range, the usage scenario, and the like of the personal information to which the present disclosure relates and obtain the authorization of the user in an appropriate manner in accordance with the relevant laws and regulations.

It is to be noted that specific nouns mentioned in the embodiments of the present disclosure are listed below. CAM: Content-Addressable Memory, with a caching mechanism exactly as opposed to Random Access Memory (RAM), it is necessary to inquire if a certain address exists through CAM index data. FPGA: Field Programmable Gate Array, a product of further development on the basis of programmable devices such as PAL (Programmable Array Logic), GAL (Generic Array Logic), it's emerged as a semi-custom circuit in the field of application specific integrated circuits (ASICs), which addresses both the shortcomings of custom circuits and the shortcomings of the limited number of gates of existing programmable devices.

To facilitate understanding of the present embodiments, first of all, a detailed introduction is made to a flow table aging method disclosed by an embodiment of the present disclosure. The execution body of the flow table aging method provided by the embodiment of the present disclosure is generally a terminal device or other processing device with certain computing capability, wherein the terminal device may be a User Equipment (UE), a mobile device, a user terminal, a terminal, a Personal Digital Assistant (PDA), a handheld device, a computer device, etc.; In some possible implementations, this flow table aging method may be implemented by way of a processor invoking computer readable instructions stored in a memory.

The flow table aging method provided by the embodiment of the present disclosure is explained below with reference to the case where the execution body is a computer apparatus, by way of example.

FIG. 1 is a flow chart of a flow table aging method provided by an embodiment of the present disclosure, which may include the following steps:

S101: determining a to-be-released flow identifier stored at a link head position of a pre-established data linked list in response to a number of assigned flow identifiers in the data linked list reaching a preset threshold; wherein the data linked list is configured to store an assigned flow identifier corresponding to a data address in accordance with an access timing sequence of the data address, and store a first association relationship between the assigned flow identifier and a previous assigned flow identifier stored prior to the assigned flow identifier, and a second association relationship between the assigned flow identifier and a next assigned flow identifier stored subsequent to the assigned flow identifier; wherein a target port identified by the assigned flow identifier is configured to count a number of data packet stored at the data address; and wherein a mapping relationship between the data address and the assigned flow identifier is configured to characterize a flow table associated with the target port.

Here, the pre-established data linked list is used to store the respective assigned flow identifiers, and the first and second association relationships between the respective assigned flow identifiers, in accordance with the timing sequence of access of the data addresses corresponding to the respective assigned flow identifiers. The data address here may be a mac address, a pointer address, or the like located in the datagram. The association relationship may be used to indicate a relationship between an assigned flow identifier and each of a previously accessed assigned flow identifier and a subsequently accessed assigned flow identifiers. The latest access time of the data address to which the previously accessed assigned flow identifier corresponds is earlier than the latest access time of the data address to which the assigned flow identifier corresponds. The latest access time of the data address to which the subsequently accessed assigned flow identifier corresponds is later than the latest access time of the data address to which the assigned flow identifier corresponds. The first association relationship is used to indicate an association between an assigned flow identifier and a previous assigned flow identifier stored prior to the assigned flow identifier, and the second association relationship is used to indicate an association between an assigned flow identifier and a next assigned flow identifier stored subsequent to the assigned flow identifier.

An assigned flow identifier is a flow identifier (flow_id (Identity document, an identification number)) assigned to a data address among preset flow identifiers, and one preset flow identifier may correspond to one data port, wherein a data port may be a logical port or a physical port. The preset flow identifier may be an identifier of each data port.

One assigned flow identifier corresponds to one flow table (flow_table) belonging to one flow entry in an entry space in which the respective flow entry is stored, so that it can be seen the entry space can be related to the data port assigned to the flow entry. One data port may be assigned to one flow entry and may be used to count information under any attribute associated with a data address, e.g., it may be used to count the number of data packets stored at the data address corresponding to the flow entry, to count the number of times the data address has been accessed, and the like. Also, one data port may correspond to one identifier that, when the data port is assigned to a flow entry, may serve as the flow identifier to which the assigned flow entry corresponds.

By way of example, the mac address is 123456 and the identifier of data port 1 is 1, then after assigning data port 1 to address 123456, identifier 1 may be taken as the assigned flow identifier of address 123456, while a mapping relationship between address 123456 and identifier 1 may be established, the mapping relationship is configured to characterize that there is a flow table associated with address 123456 and data port 1. That is, the mapping relationship between the data address and the assigned flow identifier is used to indicate the flow table associated with the data address and the data port. Flow table aging is accomplished by deleting the mapping relationship between the data address and the flow identifier to release the data port corresponding to the flow identifier.

Alternatively, a flow table may also be characterized by a mapping relationship between keywords having particular attributes in the datagram and data ports, and keywords of different attributes may correspond to different data addresses.

In the data linked list, the latest access times (which may also be referred to as the most recent access time) of the data addresses to which the assigned flow identifiers stored at different storage locations are also different, wherein the latest access time of the data address, to which the assigned flow identifier stored at the link head position corresponds, differs the longest from the current time, and the latest access time of the data address, to which the assigned flow identifier stored at the link tail position corresponds, differs the shortest from the current time. The link head position and the link tail position may be relative concepts and may be updated in response to an update of the data linked list. The link head position may refer to a corresponding storage location for the first assigned flow identifier stored in the data linked list at the current time, and the link tail position may refer to a corresponding storage location for the last assigned flow identifier stored in the data linked list at the current time.

The to-be-released flow identifier is an assigned flow identifier stored at the link head position of the data linked list when the number of assigned flow identifiers in the data linked list reaches a preset threshold. The preset threshold may be set according to experience and the total number of preset flow identifiers, which is not particularly limited in the embodiments of the present disclosure. The total number of preset flow identifiers may be set according to the size of the cache space, which is not particularly limited in the embodiments of the present disclosure, cither.

During particular implementation, a preset age AGE module may be used to query a flow identifier queue (flow_id queue, denoted by flow_idq) for storing respective preset flow identifiers, and to determine the number of unassigned preset flow identifiers according to whether the respective preset flow identifier is valid or not as indicated by its corresponding idle state indicating bit. The number of assigned flow identifiers is determined from this number, and in the case where the number of assigned flow identifiers reaches a preset threshold, the existing flow table may need to be aged in order to achieve timely release of assigned data ports. Further, the AGE module may continue to determine the assigned flow identifier stored at the link head position of the data linked list at the current time, which will be regarded as the to-be-released flow identifier, and the data port associated with this flow identifier will be regarded as the target port.

Conversely, in the case where the number of assigned flow identifiers does not reach the preset threshold, it indicates that the number of assigned target ports at this time is still within a reasonable range of usage and does not affect the operating efficiency of the system, and correspondingly, the flow table aging operation may not be performed. Thus, by setting the preset threshold, the flow table aging operation is performed only if it is determined that the number of flow identifiers as used has exceeded a certain amount, which effectively avoids the problem of performing the aging operation when the usage amount of the flow identifier is still within a reasonable range in the prior art, and effectively saves system resources.

Alternatively, the flow table aging method provided by the embodiments of the present disclosure may be applied in the field of FPGA.

S102: deleting the to-be-released flow identifier as well as the corresponding first association relationship and the corresponding second association relationship from the data linked list, and updating linked list information of the data linked list.

S103: deleting a mapping relationship between the to-be-released flow identifier and the corresponding data address, and initializing the number counted by the target port.

Here, the linked list information of the data linked list may include link head information and/or link tail information. The mapping relationship between the to-be-released flow identifier and the corresponding data address may be stored in the CAM module. Among others, the CAM module may be used for flow table learning, flow table lookup, and flow table deletion. Illustratively, in the case where the mapping relationship between the flow_id and the data address is deleted, it may be stated that the target port corresponding to the flow_id is released, and the flow table associated with the flow_id will also be successfully aged. Before initialization, the number counted by the target port may be the number of data packets stored at the data address with which the target port has a mapping relationship. After the number is initialized, the number of data packets counted by the target port is reset, thereby facilitating accurate counting of the number of data packets corresponding to other data addresses after the next time that the target port is assigned to the other data addresses. For example, the number of data packets counted by the target port is initialized to 0.

During particular implementation, since flow table aging is required to timely release data ports having been assigned for use and to improve the flow table utilization efficiency, when the number of assigned flow identifiers reaches a preset threshold, the CAM module may be used to delete the to-be-released flow identifier as well as the first association relationship and the second association relationship corresponding to the to-be-released flow identifier from the data linked list, and to update the linked list information of the data linked list.

Meanwhile, it is also possible to delete the mapping relationship between the to-be-released flow identifier and the corresponding data address with the CAM module, and initialize the number counted by the target port, thereby realizing timely release of the target port. After the target port is released, the idle state indicating bit corresponding to the preset flow identifier to which the target port corresponds may be reset as "inactive", so as to indicate that the preset flow identifier is in an idle state for subsequent reassignment of the target port. Meanwhile, after the target port is released, it can be stated that the flow table characterized by the mapping relationship between the to-be-released flow identifier and the corresponding data address is successfully aged, thereby achieving timely aging of the flow table.

In this way, sequential storage of each data flow may be achieved by storing the assigned flow identifiers corresponding to data addresses in the data linked list in accordance with the timing sequence of access. With the preset threshold, the timing of deleting the assigned flow identifiers in the data linked list can be accurately determined; and at the same time, since the respective assigned flow identifiers in the data linked list are stored according to a timing sequence, a timely release of the target port associated with the to-be-released flow identifier having the longest access time can be achieved by deleting the to-be-released flow identifier stored at the link head position, the first association relationship and second association relationship corresponding to the to-be-released flow identifier, and the mapping relationship between the to-be-released flow identifier and the corresponding data address when it is determined that the flow table aging is required, thereby completing a timely deletion of the flow table entry associated with the above-mentioned data address to achieve the flow table aging. The entire flow table aging process can achieve timely aging of the flow table without comparing the current time stamp with the time stamp corresponding to each flow table entry, but only uses the to-be-released flow identifier stored at the link head position of the data linked list, which effectively reduces the time for aging of the flow table and improves the efficiency of aging of the flow table.

In an embodiment, the data linked list may include a first linked list and a second linked list; the first linked list may be used to store a first association relationship for each assigned flow identifier, the first association relationship may be used to indicate a previous assigned flow identifier stored prior to the assigned flow identifier; and the second linked list may be used to store a second association relationship for each assigned flow identifier, the second association relationship may be used to indicate a next assigned flow identifier stored subsequent to the assigned flow identifier.

Figure 2:
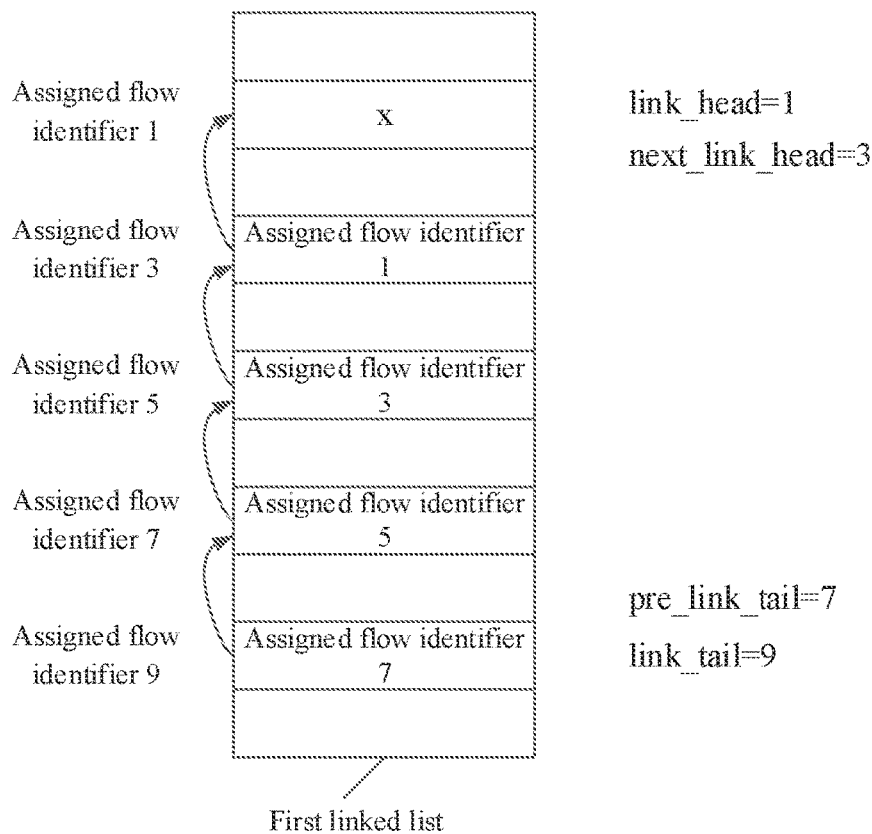
FIG. 2 shows a schematic diagram of a first linked list according to an embodiment of the present disclosure.

FIG. 2 shows a schematic diagram of a first linked list provided by an embodiment of the present disclosure, in which first association relationships corresponding to assigned flow identifiers 1, 3, 5, 7, and 9, respectively, are stored, link_head represents a link head corresponding to the assigned flow identifier 1; next_link_head represents a next link head, corresponding to the assigned flow identifier 3; link_tail represents a link tail, corresponding to the assigned flow identifier 9; pre_link_tail represents a preceding link tail, corresponding to the assigned flow identifier 7; x may represent any flow identifier or may be null. Since the link head in FIG. 2 indicates that the assigned flow identifier at the link head is 1, it can be appreciated that the assigned flow identifier 1 is the first stored flow identifier before which there are no previously stored flow identifiers, so the content x, to which the assigned flow identifier 1 is pointed, represents the first association relationship between assigned flow identifiers 1 and x, where x is null. Exemplarily, in FIG. 2, the content to which the assigned flow identifier 5 is pointed is the assigned flow identifier 3, indicating a first association relationship between the assigned flow identifier 5 and the assigned flow identifier 3, i.e., indicating that the assigned flow identifier stored prior to the assigned flow identifier 5 is the assigned flow identifier 3.

Figure 3:
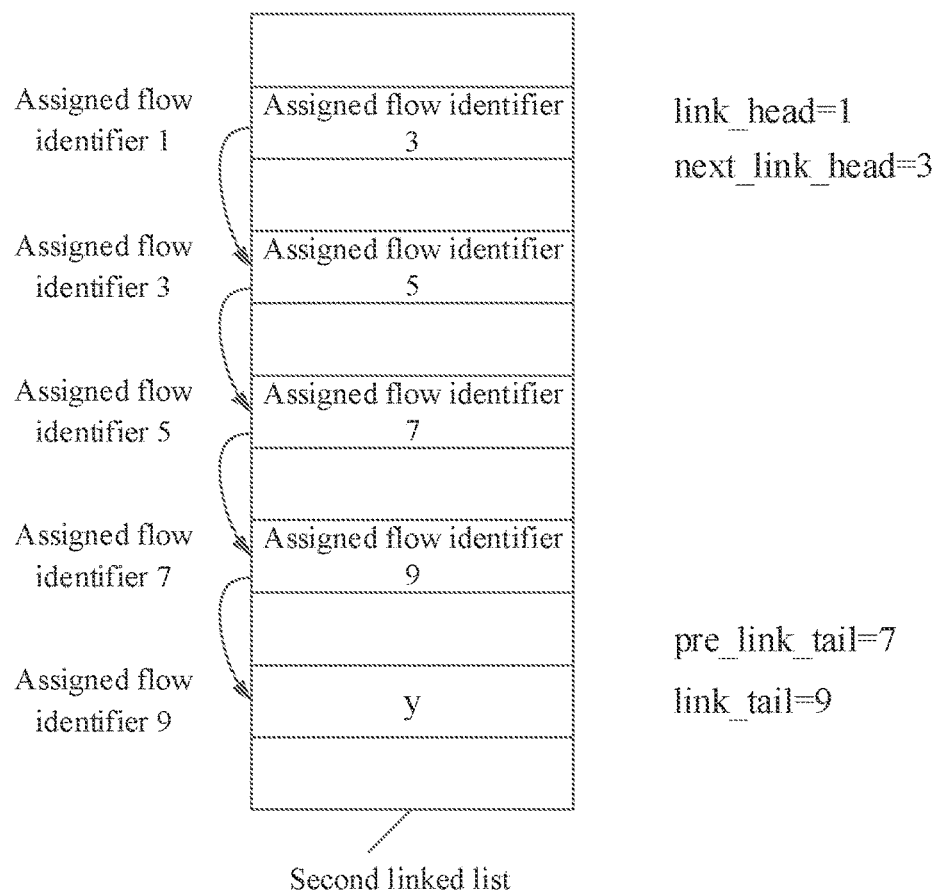
FIG. 3 shows a schematic diagram of a second linked list according to an embodiment of the present disclosure.

FIG. 3 shows a schematic diagram of a second linked list provided by an embodiment of the present disclosure, in which second association relationships corresponding to assigned flow identifiers 1, 3, 5, 7, and 9, respectively, are stored, link_head represents a link head corresponding to the assigned flow identifier 1; next_link_head represents a next link head, corresponding to the assigned flow identifier 3; link_tail represents a link tail, corresponding to the assigned flow identifier 9; pre_link_tail represents a preceding link tail, corresponding to the assigned flow identifier 7; the assigned flow identifier 1 is the first stored flow identifier, and the content to which the assigned flow identifier 1 is pointed is the assigned flow identifier 3, indicating a second association relationship between the assigned flow identifier 1 and the assigned flow identifier 3, i.e., indicating that the next assigned flow identifier stored subsequent to the assigned flow identifier 1 is the assigned flow identifier 3. For another example, in FIG. 3, the content to which the assigned flow identifier 3 is pointed is the assigned flow identifier 5, indicating a second association relationship between the assigned flow identifier 3 and the assigned flow identifier 5, i.e., indicating that the assigned flow identifier stored subsequent to the assigned flow identifier 3 is the assigned flow identifier 5. The "y" in FIG. 3 may represent any flow identifier or may be null.

Further, in the case where the data linked list includes the first linked list and the second linked list, the above step S102 may be a step related to both the first linked list and the second linked list, and specifically, the above step S102 may be implemented according to the following steps: deleting, for the first linked list, the to-be-released flow identifier and the first association relationship corresponding to the to-be-released flow identifier, and updating the assigned flow identifier corresponding to a link head position of the first linked list and the first association relationship corresponding to a next assigned flow identifier of the to-be-released flow identifier.

Taking the first linked list shown in FIG. 2 as an example, the to-be-released flow identifier may be the assigned flow identifier 1, and upon determining that entry aging is required, the assigned flow identifier 1 stored in the first linked list and the corresponding first association relationship of the assigned flow identifier 1 may be deleted. At the same time, for a link head position of the first linked list, the assigned flow identifier corresponding to the link head position may be modified from assigned flow identifier 1 to assigned flow identifier 3, that is, the assigned flow identifier corresponding to link_head is modified from assigned flow identifier 1 to assigned flow identifier 3; at the same time, the assigned flow identifier corresponding to next_link_head may be modified from assigned flow identifier 3 to assigned flow identifier 5. Also, in FIG. 2, the next assigned flow identifier of the to-be-released flow identifier is the assigned flow identifier 3, and since the to-be-released flow identifier is deleted, a change to the first association relationship corresponding to assigned flow identifier 3 is required, i.e., updating the first association relationship between assigned flow identifier 3 and assigned flow identifier 1 to the first association relationship between assigned flow identifier 3 and x (i.e., modifying the content, to which the assigned flow identifier 3 is pointed, from the assigned flow identifier 1 to x). Alternatively, since the assigned flow identifier corresponding to link_head has been modified to the assigned flow identifier 3, the first association relationship corresponding to the assigned flow identifier 3 may not be modified.

Further, for the link tail position of the first linked list, since only the to-be-released flow identifier is deleted and the new to-be-released flow identifier is not stored in the first linked list, the assigned flow identifier at the link tail position and the other assigned flow identifiers except the next assigned flow identifier of the to-be-released flow identifier will not be affected because no updating is necessary either. That is, in FIG. 2, there is no need to modify the first association relationships to which the assigned flow identifiers 5, 7, and 9 correspond.

For the second linked list, the to-be-released flow identifier and the second association relationship corresponding to the to-be-released flow identifier may be deleted, and the assigned flow identifier corresponding to the link head position of the second linked list may be updated.

Taking the second linked list shown in FIG. 3 as an example, the to-be-released flow identifier may be the assigned flow identifier 1, and when it is determined that entry aging is required, the assigned flow identifier 1 and the second association relationship corresponding to the assigned flow identifier 1 stored in the second linked list may be deleted. At the same time, for the link head position of the second linked list, the assigned flow identifier corresponding to the link head position may be modified from assigned flow identifier 1 to assigned flow identifier 3, that is, the assigned flow identifier corresponding to link_head is modified from assigned flow identifier 1 to assigned flow identifier 3; at the same time, the assigned flow identifier corresponding to next_link_head may be modified from assigned flow identifier 3 to assigned flow identifier 5. Since the association relationship stored in the second linked list is used to indicate a next assigned flow identifier stored subsequent to the assigned flow identifier, the deletion of the to-be-released flow identifier at the link head position will not affect the second association relationships of the other assigned flow identifiers stored in the second linked list. Therefore, it has no need of modifying the second association relationships of the other assigned flow identifiers.

Figure 4:
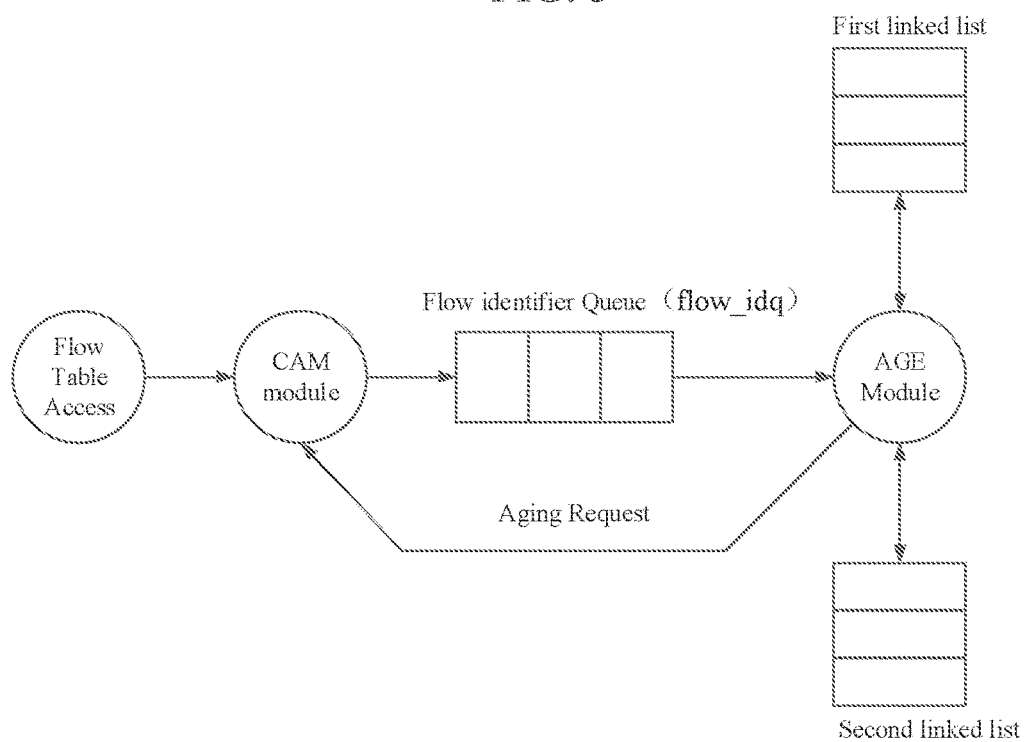
FIG. 4 shows a schematic diagram of an interaction of a CAM module and an AGE module according to an embodiment of the present disclosure.

FIG. 4 shows a schematic diagram of an interaction of a CAM module and an AGE module according to an embodiment of the present disclosure. During particular implementation, the CAM module, after receiving flow table access information, may determine whether an assigned flow identifier matched with the current flow table access information exists in the flow identifier queue based on the respective flows that have been learned. If so, the assigned flow identifier is sent to the AGE module; and the AGE module may determine, based on the assigned flow identifier, linked list updating operations associated with the first linked list and the second linked list, respectively, and generate an aging request carrying the linked list updating operations, which is fed back to the CAM module. Thereafter, the CAM module may perform the determined linked list updating operation in response to the aging request, thereby enabling updating of the first linked list and the second linked list.

In another embodiment, the data linked list may further include a doubly linked list in which respective assigned flow identifiers are stored, each assigned flow identifier has a corresponding first pointer and a corresponding second pointer, the first pointer indicates a first association relationship to which the assigned flow identifier corresponds, and the second pointer indicates a second association relationship to which the assigned flow identifier corresponds. That is, the data linked list may be a doubly linked list in which the assigned flow identifiers corresponding to the data addresses may be stored in accordance with the access timing sequence of the data addresses. At the same time, there are two pointers for each of the stored assigned flow identifiers, namely a first pointer and a second pointer, the first pointer may be pointed to the previous assigned flow identifier, for indicating a first association relationship between the assigned flow identifier and the previous assigned flow identifier; the second pointer may be pointed to the next assigned flow identifier, for indicating a second association relationship between the assigned flow identifier and the next assigned flow identifier.

In the case where the data linked list is a doubly linked list, the following steps may be performed with respect to the above S102: deleting the to-be-released flow identifier from the doubly linked list, and deleting the first association relationship indicated by the first pointer corresponding to the to-be-released flow identifier and the second association relationship indicated by the second pointer corresponding to the to-be-released flow identifier; and updating the assigned flow identifier corresponding to the link head position of the doubly linked list and the first association relationship indicated by the first pointer corresponding to the next assigned flow identifier of the to-be-released flow identifier.

Figure 5:
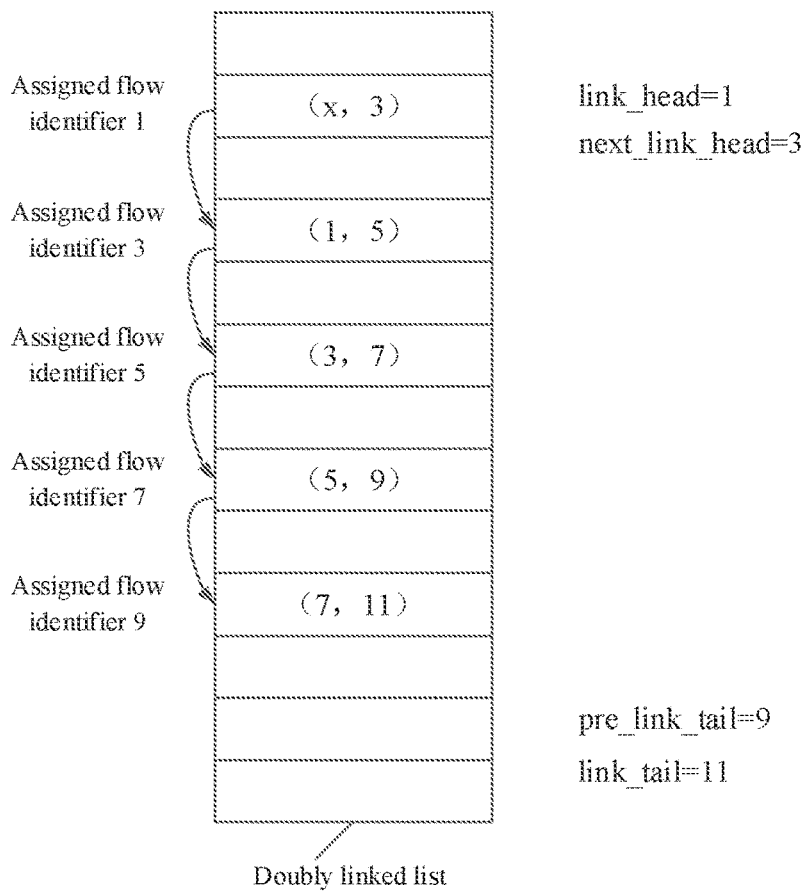
FIG. 5 shows a schematic diagram of a doubly linked list according to an embodiment of the present disclosure.

FIG. 5 shows a schematic diagram of a doubly linked list provided by an embodiment of the present disclosure, in which five assigned flow identifiers (i.e., assigned flow identifier 1, assigned flow identifier 3, assigned flow identifier 5, assigned flow identifier 7, and assigned flow identifier 9) are included, and each assigned flow identifier includes a first pointer indicating a first association relationship and a second pointer indicating a second association relationship. For example, for the assigned flow identifier 1, the first association relationship indicated by the corresponding first pointer is the association relationship between the assigned flow identifier 1 and the assigned flow identifier x, and the second association relationship indicated by the corresponding second pointer is the association relationship between the assigned flow identifier 1 and the assigned flow identifier 3.

Taking the doubly linked list in FIG. 5 as an example, the to-be-released flow identifier may be the assigned flow identifier 1; and when it's determined that entry aging is required, the assigned flow identifier 1 stored in the doubly linked list may be deleted, the first association relationship indicated by the first pointer of the assigned flow identifier 1 (i.e., the first pointer and the x to which it is pointed) may be deleted, and the second association relationship indicated by the second pointer of the assigned flow identifier 1 (i.e., the second pointer and the 3 to which it is pointed) may be deleted. At the same time, the assigned flow identifier corresponding to the link head position may be modified from assigned flow identifier 1 to assigned flow identifier 3, that is, the assigned flow identifier corresponding to link_head is modified from assigned flow identifier 1 to assigned flow identifier 3; and the assigned flow identifier corresponding to next_link_head may be modified from assigned flow identifier 3 to assigned flow identifier 5. Also, in FIG. 5, the next assigned flow identifier of the to-be-released flow identifier is the assigned flow identifier 3; and since the to-be-released flow identifier is deleted, the first association relationship corresponding to the assigned flow identifier 3 needs to be modified, e.g., the first association relationship between the assigned flow identifier 3 and the assigned flow identifier 1 is updated as the first association relationship between the assigned flow identifier 3 and the x (i.e., the content to which the first pointer of the assigned flow identifier 3 is pointed is modified from assigned flow identifier 1 to x). Alternatively, since the assigned flow identifier corresponding to link head has been modified as the assigned flow identifier 3, the first association relationship corresponding to the assigned flow identifier 3 may not be modified. And since the second association relationship indicated by the second pointer is used to indicate the next assigned flow identifier stored subsequent to the assigned flow identifier, the deletion of the to-be-released flow identifier at the link head position will not affect the second association relationships of the other assigned flow identifiers stored in the second linked list. Therefore, it also has no need of modifying the contents to which the second pointers of the other assigned flow identifiers are pointed, i.e., it has no need of modifying the second association relationships of the other assigned flow identifiers.

At the same time, in case of receiving a new data flow, the assignment of a flow identifier for the new data flow and the updating of the data linked list can also be realized according to the interaction between the CAM module and the AGE module. In particular, the data linked list may be established and updated as follows: step 1: assigning a corresponding target flow identifier for a target data address from unassigned flow identifiers among preset flow identifiers, in response to a data flow access operation for the target data address, when a target assigned flow identifier matched with the target data address does not exist.

Here, the data flow access operation is a flow table access operation, and in case there is no target assigned flow identifier matched with the target data address, i.e., it's indicated that the current data flow is a new data flow, the data flow needs to be assigned with a flow identifier in order to count the number of data packets associated with the target data address.

During particular implementation, the unassigned flow identifiers in an idle state may be determined based on the idle state indicating bits of respective preset flow identifiers stored in the flow identifier queue; then a corresponding target assigned flow identifier from the unassigned flow identifiers is assigned for the new data flow, i.e., the target data address, and the idle state indicating bit of the target flow identifier may be set to a valid state. With respect to the operation of selecting the target flow identifier, any one of the unassigned flow identifiers may be randomly selected as the target flow identifier; alternatively, the unassigned flow identifier having the smallest identifier number may be selected as the target flow identifier according to the magnitude of the corresponding identifier numbers of the respective unassigned flow identifiers. After the target data address is assigned with a target flow identifier, a mapping relationship between the target data address and the target flow identifier may be established, thereby establishing a flow table associated with the target flow identifier and the target data address.

Step 2, determining a target association relationship to which the target flow identifier corresponds, according to the assigned flow identifiers stored in the data linked list.

Step 3, updating the second association relationship of the assigned flow identifier at a link tail position of the data linked list by using the target flow identifier.

Step 4, updating link tail information of the data linked list by using the target flow identifier and the target association relationship.

Here, the target association relationship may include at least one of a first association relationship and a second association relationship to which the target flow identifier corresponds. Exemplarily, in the case where the data linked list includes a first linked list and a second linked list, the second association relationship corresponding to the assigned flow identifier at the link tail position may be the second association relationship corresponding to the assigned flow identifier 9 before storing the target flow identifier to the second linked list shown in FIG. 3 above. In the case where the data linked list includes a doubly linked list, the second association relationship corresponding to the assigned flow identifier at the link tail position may be the second association relationship to which the second pointer corresponding to the assigned flow identifier 9 is pointed, before storing the target flow identifier in the doubly linked list as shown in above FIG. 5.

During particular implementation, since the target flow identifier is the most recently assigned flow identifier and the corresponding target data address must have a latest access time later than each of the assigned flow identifiers in the data linked list, the target flow identifier will certainly be stored proceeding each of the stored assigned flow identifiers in the data linked list, i.e., the link tail information of the data linked list will be modified to ensure that the target flow identifier becomes the flow identifier at the new link tail position. Therefore, in the case where the data linked list includes a first linked list and a second linked list, the storage of the target flow identifier only affects the second association relationship corresponding to the assigned flow identifier at the original link tail position of the second linked list, so the second association relationship needs to be updated with the target flow identifier. However, when the target flow identifier is to be stored in the first linked list, it is also necessary to establish a first association relationship to which the target flow identifier corresponds. As a result, the first association relationship between the target flow identifier and the assigned flow identifier at the link tail position of the first linked list may be established prior to storing the target flow identifier in the first linked list. At the same time, the link_tail corresponding to the first linked list and the second linked list, respectively, may also be modified as the target flow identifier when the target flow identifier is stored at the link tail position of the first linked list and the second linked list.

Exemplarily, with the target flow identifier as the flow identifier 11, based on the assigned flow identifier 9 at the link tail position of the first linked list in FIG. 2, it is possible to establish a first association relationship between the flow identifier 11 and the assigned flow identifier 9, and update the link tail information of the first linked list by using the flow identifier 11 to enable storage of the flow identifier 11 (at this time, the assigned flow identifier 9 will no longer correspond to the link tail position); at the same time, link_tail of the first linked list is modified as flow identifier 11, and pre_link_tail of the first linked list is modified as assigned flow identifier 9. Also, with respect to the assigned flow identifier 9 at the link tail position of the second linked list shown in FIG. 3, it is possible to establish a second association relationship between the assigned flow identifier 9 and the flow identifier 11, and update the link tail information of the second linked list by using the flow identifier 11 to enable storage of the flow identifier 11 in the second linked list. The link_tail of the second linked list is modified as flow identifier 11, and the pre_link_tail of the second linked list is modified as assigned flow identifier 9.

At the same time, a second association relationship of the flow identifier 11 may be established, wherein the second association relationship may indicate that an assigned flow identifier is stored as an unknown value subsequent to the flow identifier 11, i.e., indicate that the flow identifier 11 is a flow identifier at the link tail position in the second linked list. Alternatively, since it is already identified by link_tail that the flow identifier 11 is located at the link tail position, it is also possible to update the link tail information of the second linked list by only using the flow identifier 11 without firstly establishing a corresponding second association relationship of the flow identifier 11, in order to achieve the storing of the flow identifier 11 in the second linked list until the link tail information is updated again; then a second association relationship between the flow identifier 11 and the newly stored flow identifier is established.

Also, a mapping relationship between the flow identifier 11 and the target data address may be established and stored in the CAM module.

Alternatively, when the data linked list is a doubly linked list, the storage of the target flow identifier only affects the second association relationship indicated by the second pointer of the assigned flow identifier at the original link tail position of the doubly linked list. Therefore, it is necessary to update the content to which the second pointer is pointed by using the target flow identifier, i.e., to modify the content to which the second pointer is pointed as the target flow identifier, so as to update the second association relationship of the assigned flow identifier at the original link tail position. However, since a first association relationship corresponding to the target flow identifier needs to be established when the target flow identifier is stored at the link tail position of the doubly linked list, the first association relationship between the target flow identifier and the assigned flow identifier at the link tail position of the doubly linked list may be established prior to storing the target flow identifier in the doubly linked list. At the same time, the corresponding link_tail of the doubly linked list may also be modified as the target flow identifier when the target flow identifier is stored at the link tail position of the doubly linked list.

For example, in FIG. 5, the first and second association relationships for the assigned flow identifiers 1, 3, 5, 7, 9, 11 are shown, e.g., the content to which the assigned flow identifier 5 is pointed is (3, 7), wherein 3 is the content to which the first pointer of the assigned flow identifier 5 is pointed, for indicating that the flow identifier stored prior to the assigned flow identifier 5 is the assigned flow identifier 3, and wherein 7 is the content to which the second pointer of the assigned flow identifier 5 is pointed, for indicating that the flow identifier stored subsequent to the assigned flow identifier 5 is the assigned flow identifier 7. In FIG. 5, since the flow identifier at the link tail position is the assigned flow identifier 11, the contents to which the first pointer and the second pointer of the assigned flow identifier 11 are pointed are not shown, i.e., the first association relationship and the second association relationship corresponding to the assigned flow identifier 11 are not shown, but the first association relationship corresponding to the assigned flow identifier 11 can also be known from the assigned flow identifier 9 corresponding to pre_link_tail. In this case, if a new flow identifier 13 needs to be stored, the link tail information of the doubly linked list may be updated by using the flow identifier 13, the link_tail is modified to correspond to the flow identifier 13, and the pre_link_tail is modified to correspond to the assigned flow identifier 11. At the same time, it is also possible to cause the first pointer corresponding to the flow identifier 11 to be pointed to the flow identifier 9 to establish a first association relationship between the flow identifier 9 and the flow identifier 11, and to cause the second pointer corresponding to the flow identifier 11 to be pointed to the flow identifier 13 to establish a second association relationship between the assigned flow identifier 11 and the flow identifier 13, i.e., to modify the content to which the assigned flow identifier 11 is pointed as (9, 13). At the same time, a target association relationship corresponding to the flow identifier 13 may also be established, and the target association relationship may be null or may be at least one of the first association relationship and the second association relationship. For example, it is possible to cause a first pointer corresponding to the flow identifier 13 to be pointed to the flow identifier 11 to establish a first association relationship between the flow identifier 11 and the flow identifier 13, and to cause a second pointer corresponding to the flow identifier 13 to be pointed to the flow identifier y (y is null) to indicate that the second association relationship corresponding to the flow identifier 13 is null. Alternatively, it is also possible to cause only the first pointer corresponding to the flow identifier 13 to be pointed to the flow identifier 11 to establish only the first association relationship between the flow identifier 11 and the flow identifier 13. Alternatively, the target association relationship corresponding to the flow identifier 13 may not be established, and the contents to which the first pointer and the second pointer corresponding to the assigned flow identifier 11 are pointed may not be shown, i.e., the first association relationship and the second association relationship corresponding to the assigned flow identifier 13 are not shown, until the link tail information is updated again, and then the first association relationship and the second association relationship corresponding to the flow identifier 13 are established.

In an embodiment, it may also be possible that a re-access is made to a data address to which a flow identifier has been assigned, i.e., it may also be possible that the target assigned flow identifier exists. In this case, the data linked list may be updated to ensure that the assigned flow identifiers stored in the data linked list are stored strictly in accordance with the timing sequence of the access of the data addresses. In particular, where a target assigned flow identifier exists, the storage location of the target assigned flow identifier in the data linked list may be determined first.

Then, a linked list updating operation may be determined based on the storage location, and the data linked list may be updated in accordance with the linked list updating operation.

Here, updating the storage of assigned flow identifiers at different storage locations may require for updating association relationships of different numbers of other assigned flow identifiers, as well as updating one or more of link head information and link tail information. Thus, for target assigned flow identifiers at different storage locations, the corresponding linked list updating operations will be different.

Exemplarily, the storage locations may be divided into a link head position, a link tail position and preset positions, the preset positions are positions other than the link head position and the link tail position.

It should be noted that if the target assigned flow identifier exists, the number of data packets counted by the target port identified by the target assigned flow identifier may also be updated.

Illustratively, in the case where the data port identified by the target assigned flow identifier is port 1, the number of data packets associated with the target data address counted by port 1 may be updated, for example, by incrementing the number by 1 or by incrementing the number by N, and N may be determined based on the number of data packets carried here for looking up the target assigned flow identifier.

During particular implementation, in the case where the storage location is located at a link head position of the data linked list, it may be determined that the linked list updating operation includes: deleting the target assigned flow identifier at the link head position and the corresponding first and second association relationships, updating the flow identifier at the link head position of the data linked list to a next assigned flow identifier of the target assigned flow identifier, updating the second association relationship of the assigned flow identifier at the link tail position of the data linked list by using the target assigned flow identifier, and updating the link tail information of the data linked list by using the target assigned flow identifier and a corresponding newly established association relationship.

Here, the newly established association relationship may include a newly established first association relationship and a newly established second association relationship to which the target assigned flow identifier corresponds, both of the two newly established association relationships may be null. The link tail information may include a link tail pointer and its corresponding second association relationship, the link tail pointer may be denoted by link_tail, and the link tail pointer is configured to indicate the flow identifier at the link tail position.

Taking the doubly linked list shown in FIG. 5 above as an example, when it is determined that there is a datagram for looking up a target assigned flow identifier (i.e., assigned flow identifier 1) at the link head position, the operations performed at this point may include: deleting the assigned flow identifier 1 stored at the link head position, deleting the first association relationship and the second association relationship corresponding to the assigned flow identifier 1 (i.e., deleting the first pointer and the second pointer corresponding to the assigned flow identifier 1), updating the link_head of the data linked list to the assigned flow identifier 3, updating the next_link_head to the assigned flow identifier 5, modifying the second association relationship corresponding to the assigned flow identifier 11 as an association relationship between the assigned flow identifier 11 and the assigned flow identifier 1 (e.g. modifying the content to which the assigned flow identifier 11 is pointed in FIG. 5 from (9, y) to (9, 1), wherein y may be a null value, i.e., the content to which the second pointer of the assigned flow identifier 11 is pointed in FIG. 5 is modified as 1), updating the link_tail to the assigned flow identifier 1, updating the pre_link_tail to the assigned flow identifier 11, modifying the content to which the assigned flow identifier 1 is pointed as (11, y), i.e., the content to which the first pointer of the assigned flow identifier 1 is pointed is set as 11, to establish a new first association relationship between the assigned flow identifier 1 and the assigned flow identifier 11; at the same time, the content to which the second pointer of the assigned flow identifier 1 is pointed is set as y, to establish a new second association relationship between the assigned flow identifier 1 and the null identifier.

Figure 6:
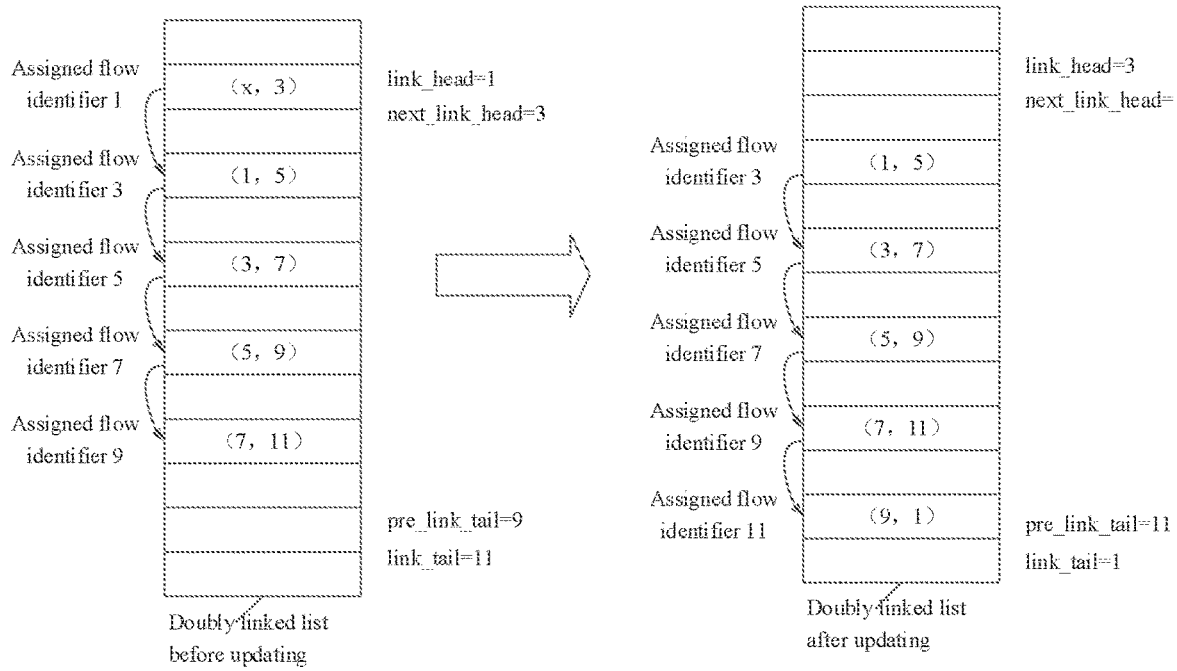
FIG. 6 shows a diagram illustrating an update of the doubly linked list after looking up the assigned flow identifier 1 of FIG. 5 in accordance with an embodiment of the present disclosure.

FIG. 6 is a schematic diagram illustrating an update of the doubly linked list after looking up the assigned flow identifier 1 of FIG. 5 in accordance with an embodiment of the present disclosure. FIG. 6 includes the doubly linked list before updating (i.e., the doubly linked list shown in FIG. 5) and the doubly linked list after updating, but the contents to which the first pointer and the second pointer of the assigned flow identifier 1 are pointed being modified as (11, y) is not shown in the doubly linked list after updating.

It should be appreciated that in the case where the data linked list includes a first linked list and a second linked list, it is possible to delete the target assigned flow identifiers at the link head positions of the first and second linked lists and the corresponding first association relationships and second association relationships, to update the flow identifiers at the link head positions of the first and second linked lists to the next assigned flow identifiers of the target assigned flow identifiers, to update the second association relationship of the assigned flow identifier at the link tail position of the second linked list by using the target assigned flow identifier, to store the target assigned flow identifiers at the link head positions of the first and second linked lists, and to establish a new first association relationship between the target assigned flow identifier and the assigned flow identifier at the original link tail position of the first linked list in the first linked list; at the same time, it's possible to establish a new second association relationship between the target assigned flow identifier and a null value in the second linked list.

In an embodiment, the data linked list may not be updated if the storage location is a link tail position. For example, when the target assigned flow identifier is the target assigned flow identifier 11 in FIG. 5, there is no need to update the data linked list because the target assigned flow identifier 11 itself is already located at the link tail position.

In another embodiment, in the case where the storage location is located at a preset position of the data linked list, it may be determined that the linked list updating operation includes: deleting the target assigned flow identifier at the storage location and the corresponding first and second association relationships, updating an established association relationship of an associated assigned flow identifier adjacent to the target assigned flow identifier, and updating the link tail information of the data linked list by using the target assigned flow identifier and the corresponding newly established association relationship.

Here, the associated assigned flow identifier may be an assigned flow identifier indicated by the first association relationship to which the target assigned flow identifier corresponds (i.e., the previous assigned flow identifier), and an assigned flow identifier indicated by the second association relationship to which the target assigned flow identifier corresponds (i.e., the next assigned flow identifier). For example, when the target assigned flow identifier is the assigned flow identifier 3 in FIG. 5, the associated assigned flow identifier may be the assigned flow identifier 1 and the assigned flow identifier 5. The established association relationship may associate a first association relationship and a second association relationship corresponding to the assigned flow identifier prior to storing the target assigned flow identifier in the data linked list, wherein the established association relationship may be null.

During particular implementation, the associated assigned flow identifiers adjacent to the target assigned flow identifier may include a previous assigned flow identifier and a next assigned flow identifier of the target assigned flow identifier. For the step of "updating an established association relationship of an associated assigned flow identifier adjacent to the target assigned flow identifier": when the next assigned flow identifier in the associated assigned flow identifiers is an assigned flow identifier at the link tail position, the first association relationship and the second association relationship corresponding to the assigned flow identifier at the link tail position may be updated, and the second association relationship of the previous assigned flow identifier in the associated assigned flow identifiers may be updated; when the next assigned flow identifier in the associated assigned flow identifiers is not the assigned flow identifier at the link tail position, the first association relationship of the next assigned flow identifier may be updated, and the second association relationship of the previous assigned flow identifier in the associated assigned flow identifiers may be updated.

Exemplarily, when the data linked list includes a first linked list and a second linked list, the target assigned flow identifiers at preset positions of the first and second linked lists as well as the corresponding first and second association relationships may be deleted, a first association relationship of a next assigned flow identifier adjacent to the target assigned flow identifier in the first linked list may be updated by using a previous assigned flow identifier of the target assigned flow identifier, a second association relationship of a previous assigned flow identifier adjacent to the target assigned flow identifier in the second linked list may be updated by using a next assigned flow identifier of the target assigned flow identifier, the target assigned flow identifier may be stored at link tail positions of the first and second linked lists, and a new first association relationship between the target assigned flow identifier and the assigned flow identifier at the original link tail position may be established in the first linked list; at the same time, a new second association relationship between the target assigned flow identifier and a null value may be established in the second linked list.

Exemplarily, still taking the doubly linked list shown in FIG. 5 as an example, when there is a datagram for looking up the assigned flow identifier 5, the following operations can be performed: deleting the assigned flow identifier 5 at a preset position, deleting the first and second association relationships corresponding to the assigned flow identifier 5 (i.e., deleting the first and second pointers of the assigned flow identifier 5 and the contents to which the two pointers are pointed), updating the second association relationship corresponding to the assigned flow identifier 3 (i.e., the content to which the second pointer of the assigned flow identifier 3 is pointed is modified as 7, so as to modify a next assigned flow identifier of the assigned flow identifier 3 as the assigned flow identifier 7), updating the first association relationship corresponding to the assigned flow identifier 7 (i.e., the content to which the first pointer of the assigned flow identifier 7 is pointed is modified as 3, so as to modify a previous assigned flow identifier of the assigned flow identifier 7 as the assigned flow identifier 3), modifying the second association relationship corresponding to the assigned flow identifier 11 as a second association relationship between the assigned flow identifier 11 and the assigned flow identifier 5 (e.g., the content to which the assigned flow identifier 11 in FIG. 5 is pointed is modified from (9, y) to (9, 5), i.e., the content to which the second pointer of the assigned flow identifier 11 is pointed is modified as 5), updating the link_tail to the assigned flow identifier 5, updating the pre_link_tail to the assigned flow identifier 11, storing the assigned flow identifier 5 at the link tail position, modifying the content to which the assigned flow identifier 5 is pointed as (11, y), i.e., the content to which the first pointer of the assigned flow identifier 5 is pointed is set to 11 so as to establish a new first association relationship between the assigned flow identifier 5 and the assigned flow identifier 11; at the same time, the content to which the second pointer of the assigned flow identifier 5 is pointed is set to y, so as to establish a new second association relationship between the assigned flow identifier 5 and a null identifier.

Figure 7:
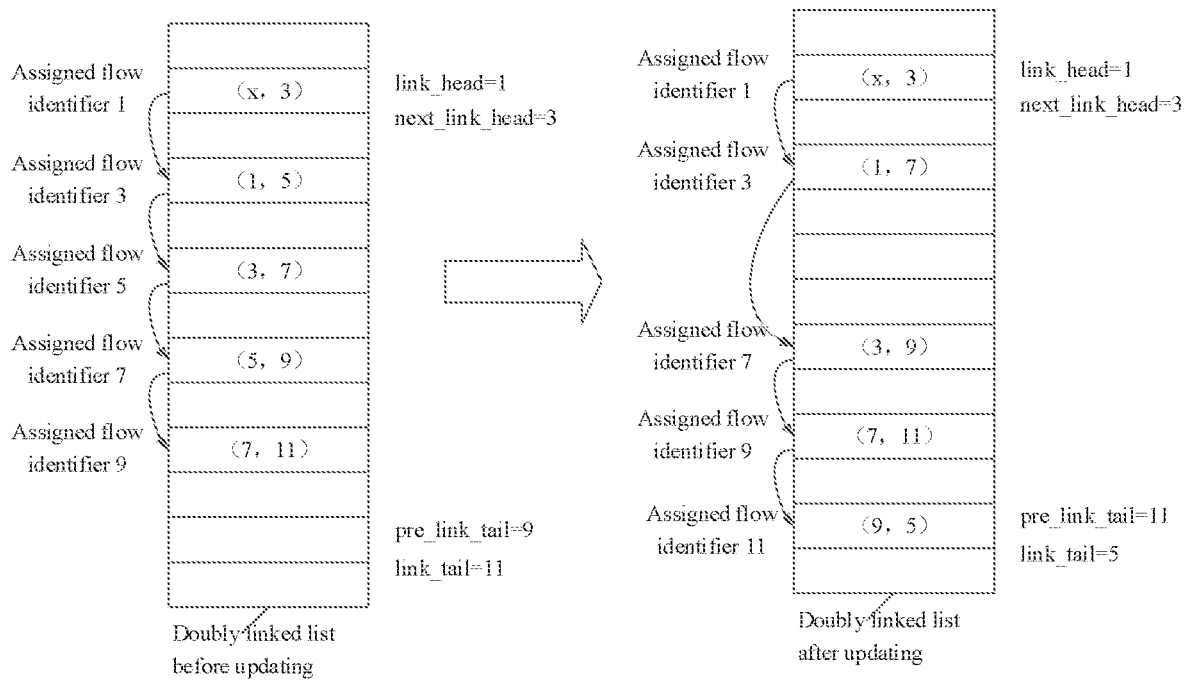
FIG. 7 shows a diagram illustrating an update of the doubly linked list after looking up the assigned flow identifier 5 of FIG. 5 in accordance with an embodiment of the present disclosure.

FIG. 7 is a schematic diagram of an update of the doubly linked list after looking up the assigned flow identifier 5 of FIG. 5 in accordance with an embodiment of the present disclosure. FIG. 7 includes the doubly linked list before updating (i.e., the doubly linked list shown in FIG. 5) and the doubly linked list after updating, but the contents to which the first pointer and the second pointer of the assigned flow identifier 5 are pointed being modified as (11, y) is not shown in the doubly linked list after updating. For the doubly linked list after updating, updating the association relationship of the associated assigned flow identifier adjacent to the target assigned flow identifier may be implemented by: modifying the contents to which the first pointer and the second pointer of the assigned flow identifier 3 are pointed as (1, 7), and modifying the contents to which the first pointer and the second pointer of the assigned flow identifier 7 are pointed as (3, 9).

Still taking the data linked list shown in FIG. 5 as an example, when there is a datagram for looking up the assigned flow identifier 9, the following operations can be performed: deleting the assigned flow identifier 9 at a preset position, deleting the first and second association relationships corresponding to the assigned flow identifier 9 (i.e., deleting the first and second pointers of the assigned flow identifier 9 and the contents to which the two pointers are pointed), updating the second association relationship corresponding to the assigned flow identifier 7 (i.e., modifying the content to which the second pointer of the assigned flow identifier 7 is pointed to 11 to effect a modification of the next assigned flow identifier of the assigned flow identifier 7 to the assigned flow identifier 11), updating the first association relationship corresponding to the assigned flow identifier 11 (i.e., modifying the content to which the first pointer of the assigned flow identifier 11 is pointed to 7 so as to implement the modification of the previous assigned flow identifier of the assigned flow identifier 11 to the assigned flow identifier 7), updating the second association relationship of the assigned flow identifier 11 (i.e., modifying the content to which the second pointer of the assigned flow identifier 11 is pointed to 9 to implement the modification of the next assigned flow identifier of the assigned flow identifier 11 to the assigned flow identifier 9), i.e., modifying the content to which the assigned flow identifier 11 in FIG. 5 is pointed from (9, y) to (7, 9), updating the link_tail to the assigned flow identifier 9, updating the pre_link tail to the assigned flow identifier 11, storing the assigned flow identifier 9 at the link tail position, modifying the content to which the assigned flow identifier 9 is pointed to (11, y), i.e., setting the content to which the first pointer of the assigned flow identifier 9 is pointed to 11, to establish a new first association relationship between the assigned flow identifier 9 and the assigned flow identifier 11; at the same time, the content to which the second pointer of the assigned flow identifier 9 is pointed is set to y to establish a new second association relationship between the assigned flow identifier 9 and the null identifier.

Figure 8:
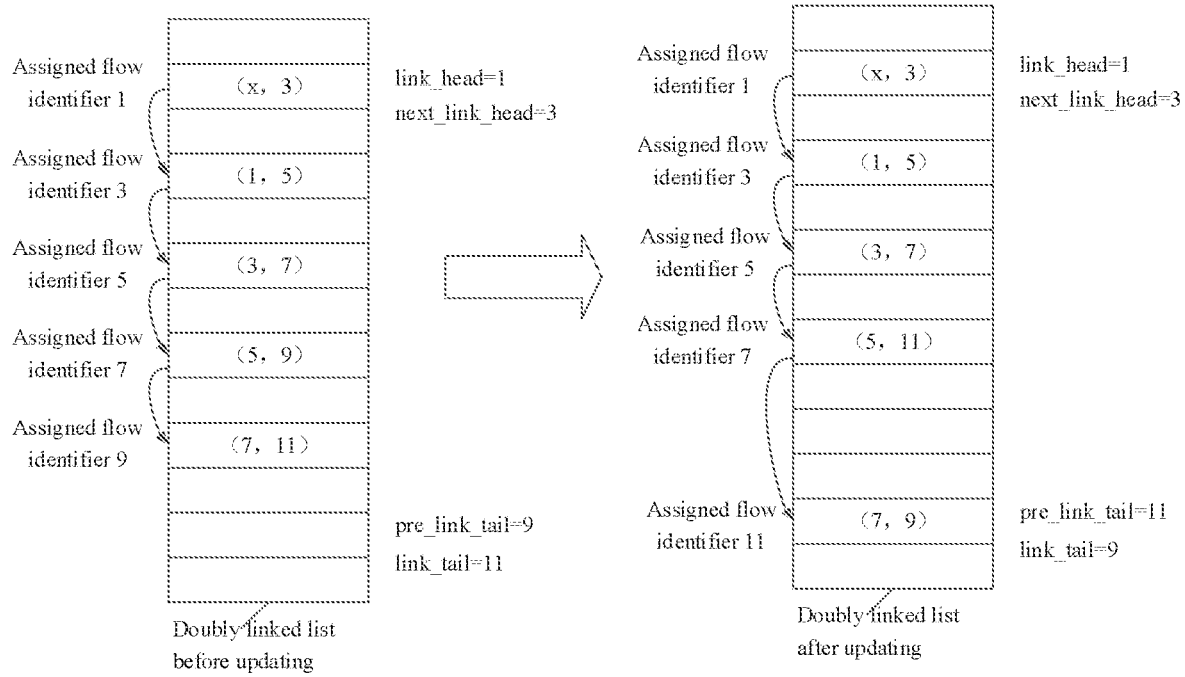
FIG. 8 shows a diagram illustrating an update of a doubly linked list after looking up the assigned flow identifier 9 of FIG. 5 in accordance with an embodiment of the present disclosure.

FIG. 8 is a schematic diagram illustrating an update of the doubly linked list after looking up the assigned flow identifier 9 of FIG. 5 in accordance with an embodiment of the present disclosure. FIG. 8 includes the doubly linked list before updating (i.e., the doubly linked list shown in FIG. 5) and the doubly linked list after updating, but the contents to which the first pointer and the second pointer of the assigned flow identifier 9 are pointed being modified to (11, y) is not shown in the doubly linked list after updating. In the doubly linked list after updating, the association relationship of the associated assigned flow identifier adjacent to the target assigned flow identifier may be updated such that, the contents to which the first pointer and the second pointer of the assigned flow identifier 7 are pointed are modified as (5, 11), and the contents to which the first pointer and the second pointer of the assigned flow identifier 11 are pointed are modified as (7, 9).

Still taking the data linked list shown in FIG. 5 as an example, when there is a datagram for looking up the assigned flow identifier 3, the following operations can be performed: deleting the assigned flow identifier 3 at a preset position, deleting the first and second association relationships corresponding to the assigned flow identifier 3 (i.e., deleting the first and second pointers of the assigned flow identifier 3 and the contents to which the two pointers are pointed), updating the second association relationship corresponding to the assigned flow identifier 1 (i.e., modifying the content to which the second pointer of the assigned flow identifier 1 is pointed to 5 so as to modify the next assigned flow identifier of the assigned flow identifier 1 to the assigned flow identifier 5), updating the first association relationship corresponding to the assigned flow identifier 5 (i.e., modifying the content to which the first pointer of the assigned flow identifier 5 is pointed to 1 so as to modify the previous assigned flow identifier of the assigned flow identifier 5 to the assigned flow identifier 1), updating the next_link_head to the assigned flow identifier 5, modifying the second association relationship corresponding to the assigned flow identifier 11 to a second association relationship between the assigned flow identifier 11 and the assigned flow identifier 3 (e.g., modifying the content to which the assigned flow identifier 11 in FIG. 5 is pointed from (9, y) to (9, 3), i.e., modifying the content to which the second pointer of the assigned flow identifier 11 in FIG. 5 is pointed to 3), updating the link_tail to the assigned flow identifier 3, updating the pre_link_tail to the assigned flow identifier 11, modifying the content to which the assigned flow identifier 3 is pointed to (11, y), i.e., the content to which the first pointer of the assigned flow identifier 3 is pointed is set to 11 so as to establish a new first association relationship between the assigned flow identifier 3 and the assigned flow identifier 11; at the same time, the content to which the second pointer of the assigned flow identifier 3 is pointed is set to y so as to establish a new second association relationship between the assigned flow identifier 3 and the null identifier.

Figure 9:
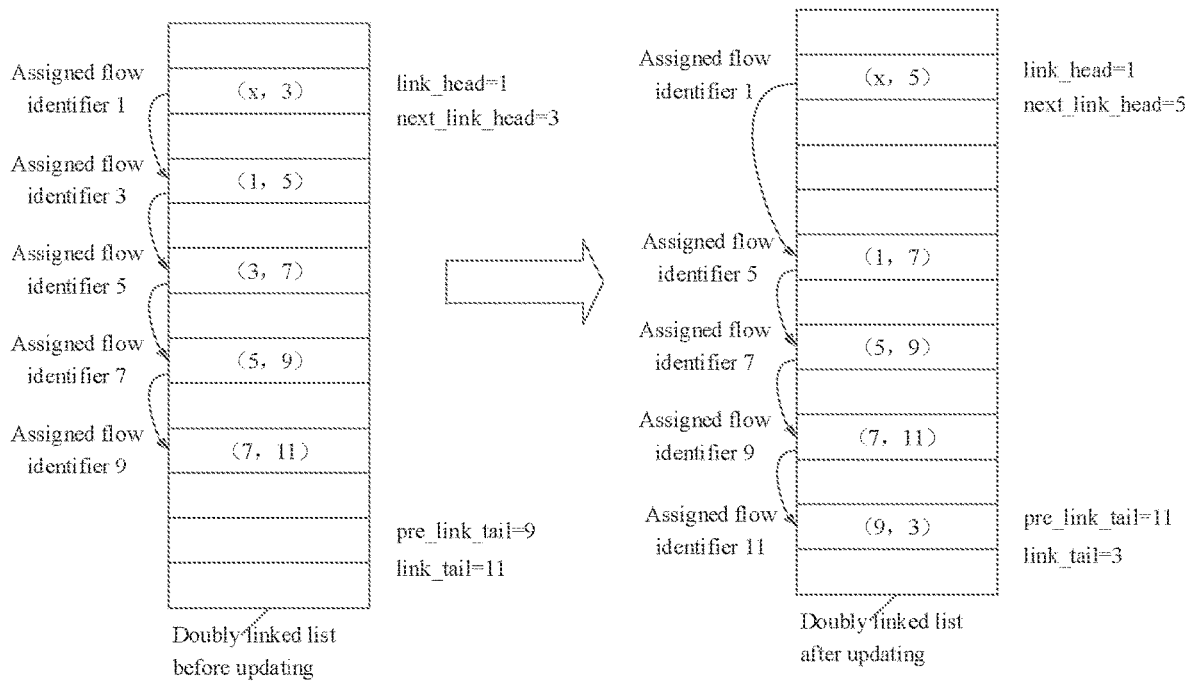
FIG. 9 shows a diagram illustrating an update of the doubly linked list after looking up the assigned flow identifier 3 of FIG. 5 in accordance with an embodiment of the present disclosure.

FIG. 9 is a schematic diagram illustrating an update of the doubly linked list after looking up the assigned flow identifier 3 of FIG. 5 according to an embodiment of the present disclosure. FIG. 9 includes the doubly linked list before updating (i.e., the doubly linked list shown in FIG. 5) and the doubly linked list after updating, but the contents to which the first pointer and the second pointer of the assigned flow identifier 3 are pointed being modified to (11, y) is not shown in the doubly linked list after updating. In the updated doubly linked list, the modification of association relationship of the associated assigned flow identifier adjacent to the target assigned flow identifier may be embodied as: the contents to which the first pointer and the second pointer of the assigned flow identifier 1 are pointed are modified to (x, 5), and the contents to which the first pointer and the second pointer of the assigned flow identifier 5 are pointed are modified to (1, 7).

It should be noted that the above-described process of updating the storage location of the target assigned flow identifier shown in FIGS. 6 to 9 is only represented in a doubly linked list, and for the case where the data linked list is divided into a first linked list and a second linked list, reference can be made to the above-described process of updating the doubly linked list, which will not be described in detail here. The data accuracy of the first linked list and the second linked list can be guaranteed by updating the first linked list and the second linked list in time.

Thus, updating and establishing the data linked list based on the storage location of the target assigned flow identifier in the data linked list ensures that the assigned flow identifier in the data linked list is stored strictly in accordance with the timing sequence of the access of the data address, and when it is determined that the aging of the entries needs to be performed, the aging of the entry with the longest access time is preferentially performed to achieve timely release of the target port.

In an implementation, the number currently counted by the target port may also be stored in a preset storage medium before initializing the number counted by the target port.

Here, the preset storage medium may specifically be a Double Data Rate Synchronous Dynamic Random Access Memory (DDR SDRAM).

During particular implementation, in order to ensure that the number information of data pockets as counted is not lost, the number currently counted by the target port may also be stored in the DDR SDRAM by using a communication link between the FPGA and the DDR SDRAM prior to initializing the number counted by the target port for long-term storage of the number information.

It will be appreciated by those skilled in the art that in the above described method of the specific implementation, the order in which the steps are written neither implies a strict order of execution nor constitutes any limitation on the implementation of the process, and that the specific order of execution of these steps should be determined by their functionality and possibly the underlying logic.

Based on the same inventive concept, a flow table aging device corresponding to the flow table aging method is further provided in the embodiment of the present disclosure, since the principle of solving the problem by the flow table aging device in the embodiment of the present disclosure is similar to the above-mentioned flow table aging method of the embodiment of the present disclosure, the implementation of the flow table aging device can be referred to the implementation of the method, which will not be repeated here.

Figure 10:
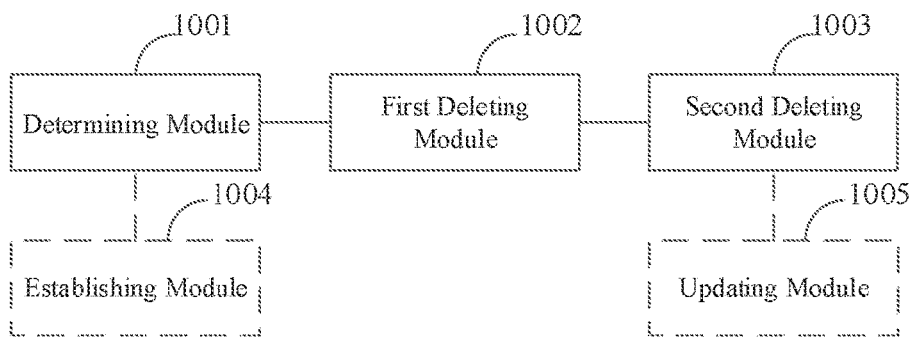
FIG. 10 shows a schematic diagram of a flow table aging device provided by an embodiment of the present disclosure.

FIG. 10 shows a schematic diagram of a flow table aging device provided by an embodiment of the present disclosure, including: a determining module 1001, configured to determine a to-be-released flow identifier stored at a link head position of a pre-established data linked list in response to a number of assigned flow identifiers in the data linked list reaching a preset threshold; wherein the data linked list is configured to store an assigned flow identifier corresponding to a data address in accordance with an access timing sequence of the data address, and store a first association relationship between the assigned flow identifier and a previous assigned flow identifier stored prior to the assigned flow identifier, and a second association relationship between the assigned flow identifier and a next assigned flow identifier stored subsequent to the assigned flow identifier; wherein a target port identified by the assigned flow identifier is configured to count a number of data packets stored at the data address; and wherein a mapping relationship between the data address and the assigned flow identifier is configured to characterize a flow table associated with the target port; a first deleting module 1002 configured to delete the to-be-released flow identifier as well as the corresponding first association relationship and the corresponding second association relationship from the data linked list, and update linked list information of the data linked list; and a second deleting module 1003, configured to delete a mapping relationship between the to-be-released flow identifier and the corresponding data address, and initialize the number counted by the target port.

In a possible implementation, the data linked list includes a first linked list and a second linked list, the first linked list stores a first association relationship for each of the assigned flow identifiers, the first association relationship indicates a previous assigned flow identifier stored prior to the assigned flow identifier. The first deleting module 1002, when deleting the to-be-released flow identifier as well as the corresponding first association relationship and the corresponding second association relationship from the data linked list, and updating the linked list information of the data linked list, is configured to: delete, for the first linked list, the to-be-released flow identifier and the first association relationship corresponding to the to-be-released flow identifier, and update the assigned flow identifier corresponding to a link head position of the first linked list and the first association relationship corresponding to a next assigned flow identifier of the to-be-released flow identifier; and delete, for the second linked list, the to-be-released flow identifier and the second association relationship corresponding to the to-be-released flow identifier, and update the assigned flow identifier corresponding to a link head position of the second linked list.

In a possible implementation, the data linked list includes a doubly linked list in which respective assigned flow identifiers are stored, each of the respective assigned flow identifiers has a corresponding first pointer and a corresponding second pointer, the first pointer is configured to indicate the first association relationship to which the assigned flow identifier corresponds, and the second pointer is configured to indicate the second association relationship to which the assigned flow identifier corresponds. The first deleting module 1002, when deleting the to-be-released flow identifier as well as the corresponding first association relationship and the corresponding second association relationship from the data linked list, and updating the linked list information of the data linked list, is configured to: delete the to-be-released flow identifier from the doubly linked list, and delete the first association relationship indicated by the first pointer corresponding to the to-be-released flow identifier and the second association relationship indicated by the second pointer corresponding to the to-be-released flow identifier; and update the assigned flow identifier corresponding to a link head position of the doubly linked list and the first association relationship indicated by the first pointer corresponding to a next assigned flow identifier of the to-be-released flow identifier.

In a possible implementation, the flow table aging device further includes: an establishing module 1004, configured to establish the data linked list according to the following steps: assigning a corresponding target flow identifier for a target data address from unassigned flow identifiers among preset flow identifiers, in response to a data flow access operation for the target data address, when a target assigned flow identifier matched with the target data address does not exist; determining a target association relationship to which the target flow identifier corresponds, according to the assigned flow identifiers stored in the data linked list; updating the second association relationship of the assigned flow identifier at a link tail position of the data linked list by using the target flow identifier; and updating link tail information of the data linked list by using the target flow identifier and the target association relationship.

In a possible implementation, the establishing module 1004 is further configured to: determine a storage location of the target assigned flow identifier in the data linked list when the target assigned flow identifier exists; and determine a linked list updating operation based on the storage location, and update the data linked list in accordance with the linked list updating operation.

In a possible implementation, the establishing module 1004, when determining a linked list updating operation based on the storage location, is configured to: when the storage location is located at the link head position of the data linked list, delete the target assigned flow identifier at the link head position of the data linked list as well as the corresponding first association relationship and the corresponding second association relationship, update a flow identifier at the link head position of the data linked list with a next assigned flow identifier of the target assigned flow identifier, update the second association relationship of the assigned flow identifier at the link tail position of the data linked list by using the target assigned flow identifier, and update the link tail information of the data linked list by using the target assigned flow identifier and a corresponding newly established association relationship.

In a possible implementation, the establishing module 1004, when determining a linked list updating operation based on the storage location, is configured to: when the storage location is located at a preset position of the data linked list, delete the target assigned flow identifier at the preset position as well as the corresponding first association relationship and the corresponding second association relationship, update an established association relationship of an associated assigned flow identifier adjacent to the target assigned flow identifier, and update the link tail information of the data linked list by using the target assigned flow identifier and a corresponding newly established association relationship; wherein the preset position is a position in the data liked list other than the link head position and the link tail position.

In a possible implementation, the flow table aging device further includes: an updating module 1005, when the target assigned flow identifier exists, configured to: update the number of data packets counted by the target port identified by the target assigned flow identifier.

For the description of the process flow of the respective modules in the flow table aging device, and the interaction flow between the respective modules, reference can be made to the related explanations in the above method embodiments, which will not be detailed here.

Figure 11:
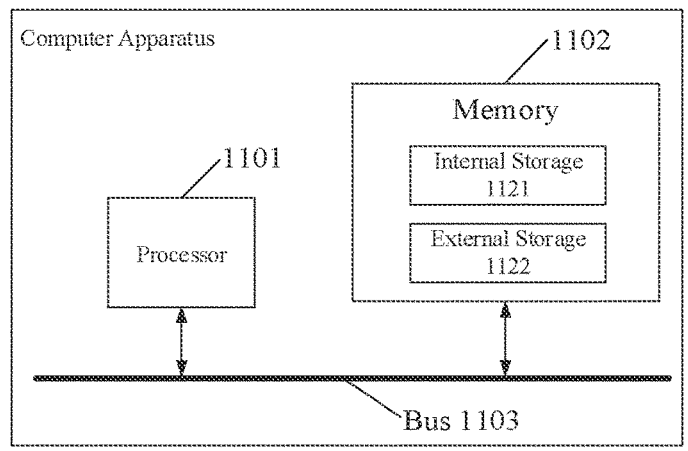
FIG. 11 shows a schematic structural diagram of a computer apparatus according to an embodiment of the present disclosure.

Based on the same technical idea, an embodiment of the present disclosure further provides a computer apparatus. Referring to FIG. 11 which is a structural diagram of a computer apparatus according to an embodiment of the present application, it includes: a processor 1101, a memory 1102, and a bus 1103. The memory 1102 stores machine-readable instructions executable by the processor 1101, the processor 1101 is configured to execute the machine-readable instructions stored in the memory 1102. When the machine-readable instructions are executed by the processor 1101, the processor 1101 performs the following steps: S101, determining a to-be-released flow identifier stored at a link head position of a pre-established data linked list in response to a number of assigned flow identifiers in the data linked list reaching a preset threshold; wherein the data linked list is configured to store an assigned flow identifier corresponding to a data address in accordance with an access timing sequence of the data address, and store a first association relationship between the assigned flow identifier and a previous assigned flow identifier stored prior to the assigned flow identifier, and a second association relationship between the assigned flow identifier and a next assigned flow identifier stored subsequent to the assigned flow identifier; wherein a target port identified by the assigned flow identifier is configured to count a number of data packet stored at the data address; and wherein a mapping relationship between the data address and the assigned flow identifier is configured to characterize a flow table associated with the target port; S102, deleting the to-be-released flow identifier as well as the corresponding first association relationship and the corresponding second association relationship from the data linked list, and updating linked list information of the data linked list; and S103, deleting a mapping relationship between the to-be-released flow identifier and the corresponding data address, and initializing the number counted by the target port.

The above-mentioned memory 1102 includes an internal storage 1121 and an external storage 1122; the internal storage 1121, also referred to herein as an internal memory, is used to temporarily store arithmetic data in the processor 1101 and data exchanged with an external storage 1122 such as a hard disk. The processor 1101 exchanges data with the external storage 1122 through the internal storage 1121. When the computer apparatus is operated, communication between the processor 1101 and the memory 1102 through the bus 1103 causes the processor 1101 to execute instructions as mentioned in the above method embodiments.

An embodiment of the present disclosure further provides a computer readable storage medium having stored a computer program thereon. When executed by a processor, the computer program executes the steps of the flow table aging method described in the above method embodiments. The storage medium may be a volatile or non-volatile computer readable storage medium.

A computer program product of a flow table aging method provided by an embodiment of the present disclosure includes a computer-readable storage medium storing program code, the program code includes instructions for executing the steps of the flow table aging method described in the above method embodiments, which can be specifically referred to the above method embodiments, and will not be described in detail herein.

The computer program product may in particular be implemented by means of hardware, software or a combination thereof. In one alternative embodiment, the computer program product is embodied as a computer storage medium, and in another alternative embodiment, the computer program product is embodied as a software product, such as a Software Development Kit (SDK) or the like.

It may be clearly understood by those skilled in the art that, for convenience and conciseness of description, the specific working processes of the device described above may refer to the corresponding processes in the foregoing method embodiments, which are not repeated herein. In the several embodiments provided by the present disclosure, it should be understood that the disclosed device and method may be implemented in other ways. The device embodiments described above are merely illustrative, for example, the division of the units is merely a logical function, and other divisions may be implemented in practice, for example, a plurality of units or components may be combined, or some features may be omitted, or not implemented. Further, the coupling or direct coupling or communication connection between each other shown or discussed may be an indirect coupling or communication connection through some communication interface, device or unit, which may be electrical, mechanical or otherwise.

The unit illustrated as a separate means may or may not be physically separate, and the means shown as a unit may or may not be a physical unit, i.e., may be located at one place, or may be distributed over a plurality of network units. Some or all of the elements may be selected according to actual needs to achieve the purpose of the present embodiment.

In addition, each functional unit in each embodiment of the present disclosure may be integrated in one processing unit, each unit may be physically present separately, and two or more units may be integrated in one unit.

The functions, if implemented in the form of a software functional unit and sold or used as a stand-alone product, may be stored in a processor-executable non-volatile computer-readable storage medium. Based on such an understanding, the technical solution of the present disclosure in essence or the part contributing to the prior art or the part of the technical solution may be embodied in the form of a software product, which is stored in a storage medium, and includes a plurality of instructions for causing a computer apparatus (which may be a personal computer, a server, or a network apparatus, etc.) to perform all or a part of the steps of the methods of the various embodiments of the present disclosure. The aforementioned storage media include various media that can store program codes, such as a compact disk, a removable hard disk, a Read-Only Memory (ROM), a Random Access Memory (RAM), a magnetic disk, or an optical disk.

If the technical solution of the present disclosure involves personal information, the products applying the technical solution of the present disclosure have clearly informed the personal information processing rules and obtained personal independent consent before processing personal information. If the technical solution of the present disclosure involves sensitive personal information, the products to which the technical solution of the present disclosure is applied have obtained individual consent before processing sensitive personal information, and at the same time satisfied the requirements of "express consent". For example, in personal information collection devices such as cameras, clear and obvious signs are set to inform that personal information has entered the collection range, and personal information will be collected. If an individual voluntarily enters the collection range, it will be regarded as agreeing to collect his personal information; or on the personal information processing device, under the condition that the personal information processing rules are informed by obvious identification/information, the personal authorization is obtained by pop-up information or asking individuals to upload their personal information by themselves; among them, personal information processing rules can include personal information processors, personal information processing purposes, processing methods, types of personal information as processed and other information.

Finally, it should be noted that the above-described embodiments are only specific implementation(s) of the present disclosure to illustrate the technical solutions of the present disclosure rather than to limit the scope of the present disclosure, and the scope of protection of the present disclosure is not limited thereto. Although the present disclosure has been described in details with reference to the foregoing embodiments, those skilled in the art will appreciate that any person skilled in the art may modify the technical solutions described in the foregoing embodiments or may easily conceive of variations, or may substitute equivalents to some of the technical features thereof, within the technical scope of the present disclosure; while these modifications, variations or replacements, which do not make the essence of the corresponding technical solutions depart from the spirit and scope of the technical solutions of the embodiments of the present disclosure, shall be covered within the scope of protection of the present disclosure. Therefore, the scope of protection of the present disclosure should be subject to the scope of protection of the claims.

The invention claimed is:

1. A flow table aging method, comprising:
  determining a to-be-released assigned flow identifier stored at a link head position of a pre-established data linked list in response to a number of assigned flow identifiers in the data linked list reaching a preset threshold; the data linked list being configured to store assigned flow identifiers corresponding to data addresses in accordance with an access timing sequence of the data addresses, and to store a first association relationship between each assigned flow identifier and a previous assigned flow identifier stored prior to the assigned flow identifier, and a second association relationship between the assigned flow identifier and a next assigned flow identifier stored subsequent to the assigned flow identifier; a target port identified by the assigned flow identifier being configured to count a number of data packets stored at the data address corresponding to the assigned flow identifier; and a mapping relationship between the data address and the corresponding assigned flow identifier being configured to characterize a flow table associated with the target port identified by the assigned flow identifier;
  deleting the to-be-released assigned flow identifier as well as the first association relationship and the second association relationship corresponding to the to-be-released assigned flow identifier from the data linked list, and updating linked list information of the data linked list; and
  deleting the mapping relationship between the to-be-released assigned flow identifier and the corresponding data address, and initializing the number counted by the target port.

2. The flow table aging method according to claim 1, wherein the data linked list comprises a first linked list and a second linked list, the first linked list is configured to store the first association relationship for each assigned flow identifier, and the first association relationship is configured to indicate the previous assigned flow identifier stored prior to the assigned flow identifier;

the deleting the to-be-released assigned flow identifier as well as the first association relationship and the second association relationship corresponding to the to-be-released assigned flow identifier from the data linked list, and updating the linked list information of the data linked list, comprises:

deleting, for the first linked list, the to-be-released assigned flow identifier and the first association relationship corresponding to the to-be-released assigned flow identifier, and updating the assigned flow identifier corresponding to a link head position of the first linked list and the first association relationship corresponding to a next assigned flow identifier of the to-be-released assigned flow identifier; and deleting, for the second linked list, the to-be-released assigned flow identifier and the second association relationship corresponding to the to-be-released assigned flow identifier, and updating the assigned flow identifier corresponding to a link head position of the second linked list.

3. The flow table aging method according to claim 1, wherein the data linked list comprises a doubly linked list in which respective assigned flow identifiers are stored, each assigned flow identifier has a corresponding first pointer and a corresponding second pointer, the first pointer is configured to indicate the first association relationship to which the assigned flow identifier corresponds, and the second pointer is configured to indicate the second association relationship to which the assigned flow identifier corresponds;

the deleting the to-be-released assigned flow identifier as well as the first association relationship and the second association relationship corresponding to the to-be-released assigned flow identifier from the data linked list, and updating the linked list information of the data linked list, comprises:

deleting the to-be-released assigned flow identifier from the doubly linked list, and deleting the first association relationship indicated by the first pointer corresponding to the to-be-released assigned flow identifier and the second association relationship indicated by the second pointer corresponding to the to-be-released assigned flow identifier; and updating the assigned flow identifier corresponding to a link head position of the doubly linked list and the first association relationship indicated by the first pointer corresponding to a next assigned flow identifier of the to-be-released assigned flow identifier.

4. The flow table aging method according to claim 2, wherein the data linked list is established according to the following steps:

assigning a corresponding target flow identifier for a target data address from unassigned flow identifiers among preset flow identifiers, in response to a data flow access operation for the target data address, when the target assigned flow identifier matched with the target data address does not exist;

determining a target association relationship to which the target flow identifier corresponds, according to the assigned flow identifiers stored in the data linked list;

updating the second association relationship of the assigned flow identifier at a link tail position of the data linked list by using the target flow identifier; and updating link tail information of the data linked list by using the target flow identifier and the target association relationship.

5. The flow table aging method according to claim 4, further comprising:

determining a storage location of the target assigned flow identifier in the data linked list when the target assigned flow identifier exists; and determining a linked list updating operation based on the storage location, and updating the data linked list in accordance with the linked list updating operation.

6. The flow table aging method according to claim 5, wherein the determining the linked list updating operation based on the storage location comprises:

when the storage location is located at the link head position of the data linked list, determining the linked list updating operation comprises: deleting the target assigned flow identifier at the link head position of the data linked list as well as the corresponding first association relationship and the corresponding second association relationship, updating the assigned flow identifier at the link head position of the data linked list with a next assigned flow identifier of the target assigned flow identifier, updating the second association relationship of the assigned flow identifier at the link tail position of the data linked list by using the target assigned flow identifier, and updating the link tail information of the data linked list by using the target assigned flow identifier and a corresponding newly established association relationship.

7. The flow table aging method according to claim 5, wherein the determining the linked list updating operation based on the storage location comprises:

when the storage location is located at a preset position of the data linked list, determining the linked list updating operation comprises: deleting the target assigned flow identifier at the storage location as well as the corresponding first association relationship and the corresponding second association relationship, updating an established association relationship of an associated assigned flow identifier adjacent to the target assigned flow identifier, and updating the link tail information of the data linked list by using the target assigned flow identifier and a corresponding newly established association relationship, wherein the preset position is a position in the data liked list other than the link head position and the link tail position.

8. The flow table aging method according to claim 5, wherein when the target assigned flow identifier exists, further comprising:

updating the number of data packets counted by the target port identified by the target assigned flow identifier.

9. A computer apparatus, comprising a processor and a memory storing machine-readable instructions executable by the processor, wherein the processor is configured to execute the machine-readable instructions stored in the memory, and wherein when the machine-readable instructions are executed by the processor, the processor performs steps of a flow table aging method comprising:

determining a to-be-released assigned flow identifier stored at a link head position of a pre-established data linked list in response to a number of assigned flow identifiers in the data linked list reaching a preset threshold; the data linked list being configured to store assigned flow identifiers corresponding to data addresses in accordance with an access timing sequence of the data addresses, and to store a first association relationship between each assigned flow identifier and a previous assigned flow identifier stored prior to the assigned flow identifier, and a second association relationship between the assigned flow identifier and a next assigned flow identifier stored subsequent to the assigned flow identifier; a target port identified by the assigned flow identifier being configured to count a number of data packets stored at the data address corresponding to the assigned flow identifier; and a mapping relationship between the data address and the corresponding assigned flow identifier being configured to characterize a flow table associated with the target port identified by the assigned flow identifier;

deleting the to-be-released assigned flow identifier as well as the first association relationship and the second association relationship corresponding to the to-be-released assigned flow identifier from the data linked list, and updating linked list information of the data linked list; and deleting the mapping relationship between the to-be-released assigned flow identifier and the corresponding data address, and initializing the number counted by the target port.

10. The computer apparatus according to claim 9, wherein in the flow table aging method, the data linked list comprises a first linked list and a second linked list, the first linked list is configured to store the first association relationship for each assigned flow identifier, and the first association relationship is configured to indicate the previous assigned flow identifier stored prior to the assigned flow identifier;

the deleting the to-be-released assigned flow identifier as well as the first association relationship and the second association relationship corresponding to the to-be-released assigned flow identifier from the data linked list, and updating the linked list information of the data linked list, comprises:

deleting, for the first linked list, the to-be-released assigned flow identifier and the first association relationship corresponding to the to-be-released assigned flow identifier, and updating the assigned flow identifier corresponding to a link head position of the first linked list and the first association relationship corresponding to a next assigned flow identifier of the to-be-released assigned flow identifier; and deleting, for the second linked list, the to-be-released assigned flow identifier and the second association relationship corresponding to the to-be-released assigned flow identifier, and updating the assigned flow identifier corresponding to a link head position of the second linked list.

11. The computer apparatus according to claim 9, wherein in the flow table aging method, the data linked list comprises a doubly linked list in which respective assigned flow identifiers are stored, each assigned flow identifier has a corresponding first pointer and a corresponding second pointer, the first pointer is configured to indicate the first association relationship to which the assigned flow identifier corresponds, and the second pointer is configured to indicate the second association relationship to which the assigned flow identifier corresponds;

the deleting the to-be-released assigned flow identifier as well as the first association relationship and the second association relationship corresponding to the to-be-released assigned flow identifier from the data linked list, and updating the linked list information of the data linked list, comprises:

deleting the to-be-released assigned flow identifier from the doubly linked list, and deleting the first association relationship indicated by the first pointer corresponding to the to-be-released assigned flow identifier and the second association relationship indicated by the second pointer corresponding to the to-be-released assigned flow identifier; and updating the assigned flow identifier corresponding to a link head position of the doubly linked list and the first association relationship indicated by the first pointer corresponding to a next assigned flow identifier of the to-be-released assigned flow identifier.

12. The computer apparatus according to claim 10, wherein in the flow table aging method, the data linked list is established according to the following steps:

assigning a corresponding target flow identifier for a target data address from unassigned flow identifiers among preset flow identifiers, in response to a data flow access operation for the target data address, when the target assigned flow identifier matched with the target data address does not exist;

determining a target association relationship to which the target flow identifier corresponds, according to the assigned flow identifiers stored in the data linked list;

updating the second association relationship of the assigned flow identifier at a link tail position of the data linked list by using the target flow identifier; and updating link tail information of the data linked list by using the target flow identifier and the target association relationship.

13. The computer apparatus according to claim 12, wherein the flow table aging method further comprises:

determining a storage location of the target assigned flow identifier in the data linked list when the target assigned flow identifier exists; and determining a linked list updating operation based on the storage location, and updating the data linked list in accordance with the linked list updating operation.

14. The computer apparatus according to claim 13, wherein in the flow table aging method, the determining the linked list updating operation based on the storage location comprises:

when the storage location is located at the link head position of the data linked list, determining the linked list updating operation comprises: deleting the target assigned flow identifier at the link head position of the data linked list as well as the corresponding first association relationship and the corresponding second association relationship, updating the assigned flow identifier at the link head position of the data linked list with a next assigned flow identifier of the target assigned flow identifier, updating the second association relationship of the assigned flow identifier at the link tail position of the data linked list by using the target assigned flow identifier, and updating the link tail information of the data linked list by using the target assigned flow identifier and a corresponding newly established association relationship.

15. The computer apparatus according to claim 13, wherein in the flow table aging method, the determining the linked list updating operation based on the storage location comprises:

when the storage location is located at a preset position of the data linked list, determining the linked list updating operation comprises: deleting the target assigned flow identifier at the storage location as well as the corresponding first association relationship and the corresponding second association relationship, updating an established association relationship of an associated assigned flow identifier adjacent to the target assigned flow identifier, and updating the link tail information of the data linked list by using the target assigned flow identifier and a corresponding newly established association relationship, wherein the preset position is a position in the data liked list other than the link head position and the link tail position.

16. The computer apparatus according to claim 13, wherein in the flow table aging method, when the target assigned flow identifier exists, further comprising:

updating the number of data packets counted by the target port identified by the target assigned flow identifier.

17. A non-transitory computer-readable storage medium having a computer program stored thereon, wherein when the computer program is executed by a computer apparatus, the computer apparatus performs steps of a flow table aging method comprising:

determining a to-be-released assigned flow identifier stored at a link head position of a pre-established data linked list in response to a number of assigned flow identifiers in the data linked list reaching a preset threshold; the data linked list being configured to store assigned flow identifiers corresponding to data addresses in accordance with an access timing sequence of the data addresses, and to store a first association relationship between each assigned flow identifier and a previous assigned flow identifier stored prior to the assigned flow identifier, and a second association relationship between the assigned flow identifier and a next assigned flow identifier stored subsequent to the assigned flow identifier; a target port identified by the assigned flow identifier being configured to count a number of data packets stored at the data address corresponding to the assigned flow identifier; and a mapping relationship between the data address and the corresponding assigned flow identifier being configured to characterize a flow table associated with the target port identified by the assigned flow identifier;

deleting the to-be-released assigned flow identifier as well as the first association relationship and the second association relationship corresponding to the to-be-released assigned flow identifier from the data linked list, and updating linked list information of the data linked list; and deleting the mapping relationship between the to-be-released assigned flow identifier and the corresponding data address, and initializing the number counted by the target port.

18. The non-transitory computer-readable storage medium according to claim 17, wherein in the flow table aging method, the data linked list comprises a first linked list and a second linked list, the first linked list is configured to store the first association relationship for each assigned flow identifier, and the first association relationship is configured to indicate the previous assigned flow identifier stored prior to the assigned flow identifier;

the deleting the to-be-released assigned flow identifier as well as the first association relationship and the second association relationship corresponding to the to-be-released assigned flow identifier from the data linked list, and updating the linked list information of the data linked list, comprises:

deleting, for the first linked list, the to-be-released assigned flow identifier and the first association relationship corresponding to the to-be-released assigned flow identifier, and updating the assigned flow identifier corresponding to a link head position of the first linked list and the first association relationship corresponding to a next assigned flow identifier of the to-be-released assigned flow identifier; and deleting, for the second linked list, the to-be-released assigned flow identifier and the second association relationship corresponding to the to-be-released assigned flow identifier, and updating the assigned flow identifier corresponding to a link head position of the second linked list.

19. The non-transitory computer-readable storage medium according to claim 17, wherein in the flow table aging method, the data linked list comprises a doubly linked list in which respective assigned flow identifiers are stored, each assigned flow identifier has a corresponding first pointer and a corresponding second pointer, the first pointer is configured to indicate the first association relationship to which the assigned flow identifier corresponds, and the second pointer is configured to indicate the second association relationship to which the assigned flow identifier corresponds;

the deleting the to-be-released assigned flow identifier as well as the first association relationship and the second association relationship corresponding to the to-be-released assigned flow identifier from the data linked list, and updating the linked list information of the data linked list, comprises:

deleting the to-be-released assigned flow identifier from the doubly linked list, and deleting the first association relationship indicated by the first pointer corresponding to the to-be-released assigned flow identifier and the second association relationship indicated by the second pointer corresponding to the to-be-released assigned flow identifier; and updating the assigned flow identifier corresponding to a link head position of the doubly linked list and the first association relationship indicated by the first pointer corresponding to a next assigned flow identifier of the to-be-released assigned flow identifier.

20. The non-transitory computer-readable storage medium according to claim 18, wherein in the flow table aging method, the data linked list is established according to the following steps:

assigning a corresponding target flow identifier for a target data address from unassigned flow identifiers among preset flow identifiers, in response to a data flow access operation for the target data address, when the target assigned flow identifier matched with the target data address does not exist;

determining a target association relationship to which the target flow identifier corresponds, according to the assigned flow identifiers stored in the data linked list;

updating the second association relationship of the assigned flow identifier at a link tail position of the data linked list by using the target flow identifier; and updating link tail information of the data linked list by using the target flow identifier and the target association relationship.

\* \* \* \* \*